(12) United States Patent
Otake

(10) Patent No.: US 7,944,536 B2
(45) Date of Patent: May 17, 2011

(54) REFLECTIVE BILATERAL LIQUID CRYSTAL DEVICE AND ELECTRONIC APPARATUS

(75) Inventor: Toshihiro Otake, Okaya (JP)

(73) Assignee: Sony Corporation, Tokyo (JP)

( * ) Notice: Subject to any disclaimer, the term of this patent is extended or adjusted under 35 U.S.C. 154(b) by 187 days.

(21) Appl. No.: 11/696,415

(22) Filed: Apr. 4, 2007

(65) Prior Publication Data

US 2008/0036953 A1 Feb. 14, 2008

(30) Foreign Application Priority Data

Jun. 6, 2006 (JP) .................................. 2006-157007

(51) Int. Cl.
*G02F 1/1335* (2006.01)
*G02F 1/1333* (2006.01)
(52) U.S. Cl. .......................... 349/138; 349/113; 349/106
(58) Field of Classification Search .................. 349/138, 349/113, 97, 104, 106
See application file for complete search history.

(56) References Cited

U.S. PATENT DOCUMENTS

| | | | | |
|---|---|---|---|---|
| 6,501,529 B1 * | 12/2002 | Kurihara et al. | ............. | 349/160 |
| 6,624,860 B1 * | 9/2003 | Narutaki et al. | ............. | 349/106 |
| 6,771,334 B2 * | 8/2004 | Kubota et al. | ................. | 349/106 |
| 2003/0063243 A1 * | 4/2003 | Roosendaal et al. | ........... | 349/113 |
| 2004/0115846 A1 * | 6/2004 | Otake et al. | ..................... | 438/22 |
| 2005/0225705 A1 | 10/2005 | Chae et al. | | |

FOREIGN PATENT DOCUMENTS

| | | |
|---|---|---|
| JP | 2003-075987 | 3/2003 |
| JP | 2003-344835 | 12/2003 |
| JP | 2004-012933 | 1/2004 |
| JP | 2004-117720 | 4/2004 |
| JP | 2004-272195 | 9/2004 |
| JP | 2005-077429 | 3/2005 |
| JP | 2005-078802 | 3/2005 |
| JP | 2005-084431 | 3/2005 |
| JP | 2005-301276 | 10/2005 |

* cited by examiner

*Primary Examiner* — Brian M. Healy
*Assistant Examiner* — Michael Inadomi
(74) *Attorney, Agent, or Firm* — K&L Gates LLP

(57) ABSTRACT

A liquid crystal device includes a first substrate and a second substrate that face each other, a liquid crystal layer that is interposed between the first substrate and the second substrate, light reflecting films that are selectively provided on the side facing the liquid crystal layer of the first substrate and reflect light entering from the second substrate, light reflecting films that are selectively provided on the side facing the liquid crystal layer of the second substrate, corresponding to the regions of the first substrate where the light reflecting films are not provided and reflect light entering from the first substrate, transmissive electrodes that are selectively provided in the regions of the side facing the liquid crystal layer of the first substrate where the light reflecting films are not provided, and transmissive electrodes that are selectively provided in the regions of the side facing the liquid crystal layer of the second substrate where the light reflecting films are not provided.

8 Claims, 13 Drawing Sheets

REFLECTIVE BILATERAL LIQUID CRYSTAL DEVICE AND ELECTRONIC APPARATUS

BACKGROUND

1. Technical Field

The present invention relates to a liquid crystal device that forms images by modulating light passing through a liquid crystal layer. Further, the invention relates to an electronic apparatus using the liquid crystal device.

2. Related Art

Liquid crystal devices are now in wide use in electronic apparatuses, such as mobile phones and portable information terminals, as display portions that visually display a variety of information relating to operation of the electronic apparatuses. Such a liquid crystal device generally has a liquid crystal panel formed by disposing a liquid crystal layer between a pair of substrates facing each other and displays images, such as characters, numbers, and figures, on the outer surface of the later one of the substrates in the travel direction of light by modulating light passing through the liquid crystal panel for each of a plurality of sub-pixels.

Liquid crystal devices with two liquid crystal panels overlapped have been proposed in the related art, in which double-sided display is performed by performing display on the front surface using one of the two liquid crystal panels and performing display on the rear surface using the other liquid crystal panel (for example, see JP-A-2005-77429 (claims 3 to 4 and FIG. 1) and JP-A-2005-78802 (claim 4 and FIG. 1).

Recently, it has been required for electronic apparatuses, such as mobile phones, to decrease in size and thickness. For this reason, liquid crystal devices for such electronic apparatuses are also required to decrease the overall thickness. However, the liquid crystal devices disclosed in JP-A-2005-77429 and JP-A-2005-78802 each have two liquid crystal panels, so that they are generally thick compared with other liquid crystal devices that display images using only one liquid crystal panel. Therefore, it was difficult to manufacture thin electronic apparatuses each using the liquid crystal devices with two liquid crystal panels.

SUMMARY

An advantage of some aspects of the invention is that it provides a thin liquid crystal device capable of displaying images on both front and rear surfaces.

According to an aspect of the invention, a liquid crystal device includes a first substrate and a second substrate that face each other, a liquid crystal layer that is interposed between the first substrate and the second substrate, light reflecting films that are selectively provided on the side facing the liquid crystal layer of the first substrate and reflect light entering from the second substrate, light reflecting films that are selectively provided on the side facing the liquid crystal layer of the second substrate, corresponding to the regions of the first substrate where the light reflecting films are not provided and reflect light entering from the first substrate, transmissive electrodes that are selectively provided in the regions of the side facing the liquid crystal layer of the first substrate where the light reflecting films are not provided, and transmissive electrodes that are selectively provided in the regions of the side facing the liquid crystal layer of the second substrate where the light reflecting films are not provided.

According to the liquid crystal device having the above configuration, the first substrate and the second substrate are formed of a transmissive material, such as transmissive glass or transmissive plastic. Further, the light reflecting films provided on the first substrate and the second substrate are made of aluminum (Al) etc. for example, and reflect external light, such as interior light, to use the light for display. Further, the transmissive electrodes provided on the first substrate and the second substrate are made of ITO (Indium Tin Oxide) for example. For example, the light reflecting films or electrodes of other electric conductive material are disposed facing the transmissive electrodes and alignment of liquid crystal molecules in the liquid crystal layer is controlled by voltage applied between the transmissive electrodes and the electrodes facing the aforementioned transmissive electrodes.

According to the liquid crystal device having the above configuration, the light reflecting films provided on the side facing the liquid crystal layer of the second substrate reflect light, entering from the first substrate, to the first substrate. Images are formed on the surface of the first substrate by the reflected light. On the other hand, the light reflecting films provided on the side facing the liquid crystal layer of the first substrate reflect light, entering from the second substrate, to the second substrate. Images are formed on the surface of the second substrate by the reflected light.

As described above, in the liquid crystal device according to the aspect of the invention, since images are formed on the surface of the first substrate by light reflecting off the light reflecting films on the side facing the liquid crystal layer of the second substrate and on the surface of the second substrate by light reflecting off the light reflecting films on the side facing the liquid crystal layer of the first substrate, it is possible to achieve a double-sided display liquid crystal device using one liquid crystal panel consisting of two substrates, that is, the first substrate and the second substrate. As a result, it is possible to reduce the overall thickness of a liquid crystal device, as compared with liquid crystal devices that display images on both sides of the front and rear surfaces using two liquid crystal panels in the related art.

A liquid crystal device of the invention includes a plurality of sub-pixels that are arranged in a first direction and a second direction crossing each other. The sub-pixels include first sub-pixels where light reflecting films are provided on the side facing the liquid crystal layer of the second substrate and second sub-pixels where light reflecting films are provided on the side facing the liquid crystal layer of the first substrate, and the first sub-pixels are different from the second sub-pixels in size.

Each of the first sub-pixels and the second sub-pixels is the region of minimal display unit. A display region of the entire region for display is defined by arranging the first sub-pixels and the second sub-pixels in a first direction and a second direction in a plane. The first direction may be the direction along a scanning line that allows scanning signals to be transmitted to each of the sub-pixels. Further, the second direction is the direction along a data line that is disposed perpendicular to the scanning line and that allows data signals to be transmitted to each of the sub-pixels.

Double-sided display liquid crystal devices that perform main display on one display surface and sub-display of the other display surface are in wide use. In these liquid crystal devices, it is preferable to increase display precision for the main display relative to the sub-display. The liquid crystal device according to the aspect of the invention, the first sub-pixels are different from the second sub-pixels in size, so that it is possible to make the display precision of the front surface different from that of the rear surface. For example, in the first sub-pixels and the second-sub-pixels, when the sub-pixels for main display are set larger than the sub-pixels for sub-display, precision for the main display is increased.

The liquid crystal device according to the aspect of the invention further includes a plurality of sub-pixels that are arranged in a first direction and a second direction crossing each other. The sub-pixels include first sub-pixels where light reflecting films are provided on the side facing the liquid crystal layer of the second substrate and second sub-pixels where light reflecting films are provided on the side facing the liquid crystal layer of the first substrate. The first sub-pixels and the second sub-pixels are respectively arranged adjacent to each other in any one of the first direction and the second direction. The first sub-pixels and the second sub-pixels are alternately arranged in the other of the first direction and the second direction.

When the first sub-pixels and the second sub-pixels are arranged adjacent to each other in the first direction and the second direction, the display regions of the first substrate and the second substrate may lean to sides in narrow regions in the plane regions of the first substrate and the second substrate.

Therefore, according to the aspect of the invention, when the first sub-pixels and the second sub-pixels are respectively arranged adjacent to each other in one of the first direction and the second direction and the first sub-pixels and the second sub-pixels are alternately arranged in the other of the first direction and the second direction, it is possible to effectively arrange the first sub-pixels and the second sub-pixels in the plane regions of the first substrate and the second substrate. As a result, the display regions of the first substrate and the second substrate do not lean to sides and can be formed wide.

In the liquid crystal device according to the aspect of the invention, the transmissive electrodes provided in the first sub-pixels on the side facing the liquid crystal layer of the first substrate are disposed in a strip along the second sub-pixels adjacent to each other and the transmissive electrodes provided in the second sub-pixels on the side facing the liquid crystal layer of the second substrate are disposed in a strip along the first sub-pixels adjacent to each other.

In the liquid crystal device, when the whole transmissive electrodes are formed into dot shapes (that is, island shapes) in the sub-pixels, it is required to provide individual electric conductive members that electrically connect the dot-shaped electrodes. In this case, the components formed on the first substrate and the second substrate are complicated in structure, which makes manufacturing of the liquid crystal device difficult and causes poor operation of the liquid crystal device.

In the liquid crystal device according to the aspect of the invention, since the transmissive electrodes arranged adjacent to each other in the first sub-pixels on the first substrate are disposed in a strip along the second sub-pixels and the transmissive electrodes arranged adjacent to each other in the second sub-pixels on the second substrate are disposed in a strip along the first sub-pixels, the configuration of the electrodes on the first substrate and the second substrate is simple. Accordingly, it is easy to manufacture the liquid crystal device and it is possible to prevent problems, such as disconnection, in the liquid crystal device.

In the liquid crystal device according to the aspect of the invention, it is preferable to provide, in a predetermined arrange, coloring films of one color or a plurality of colors on at least one of the first substrate and the second substrate, corresponding to each of the first sub-pixels and the second sub-pixels. In the liquid crystal device having the above configuration, when coloring films of one color are provided corresponding to each of the first sub-pixels and the second sub-pixels, display using one color, that is, mono-color display is achievable. When coloring films are not provided, black and white display is achievable. On the other hand, when coloring films of a plurality of colors are provided corresponding to the first sub-pixels and the second sub-pixels, color display is achievable using the colors. For example, when coloring films of three colors R (red), G (green), B (blue) are provided, display using the three colors R, G, and B, that is, full color display is achievable.

According to another aspect of the invention, an electronic apparatus includes the liquid crystal device having the above configurations. The liquid crystal device forms images on the surface of the first substrate using the first sub-pixels and on the surface of the second substrate using the second sub-pixels. Therefore, double-sided display is possible by means of one liquid crystal panel consisting of two substrates of the first substrate and the second substrate. As a result, it is possible to reduce the overall thickness of a liquid crystal device, as compared with liquid crystal devices that display images on both sides of the front and rear surfaces using two liquid crystal panels in the related art. Therefore, the electronic apparatus according to another aspect of the invention including the liquid crystal device is also reduced in thickness.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment of Liquid Crystal Device

Preferred embodiments of the invention are described hereafter by exemplifying a reflective liquid crystal device to which the invention is applied that is capable of displaying colors by driving TFTs (Thin Film Transistor) as a liquid crystal device. Further, in this embodiment, the invention is applied to a liquid crystal device with amorphous silicon TFT elements of an H-channel-type single gate structure, as TFT elements. The invention is not limited to the embodiments. Further, a plurality of components may be shown having dimensions different from their actual dimensions to aid understanding of figures referred to in relation to the following description.

Figure 1:
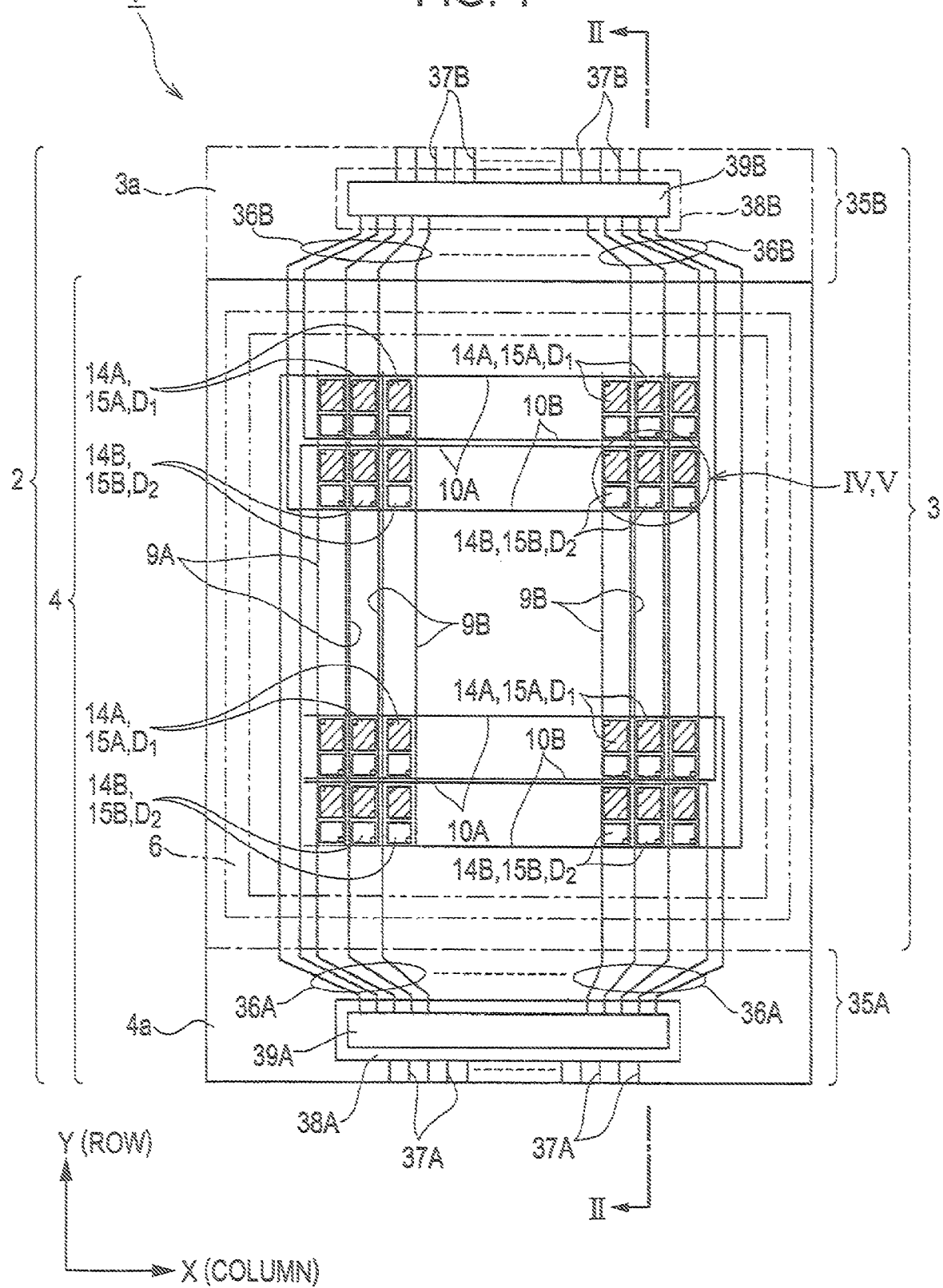
FIG. 1 is a plan view of a liquid crystal device according to an embodiment of the invention.
Figure 2:
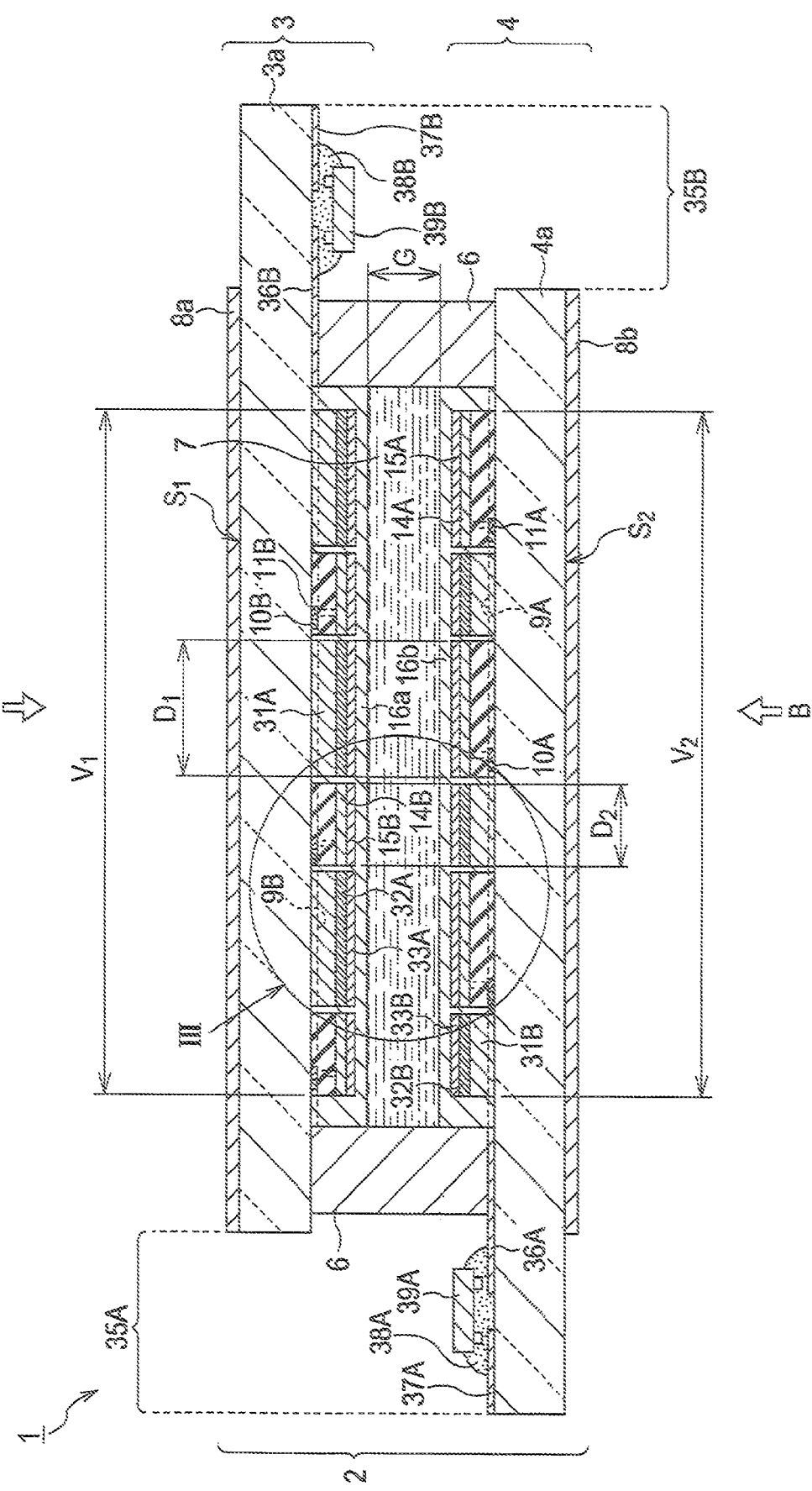
FIG. 2 is a cross-sectional view of FIG. 1 taken along the line II-II.
Figure 3:
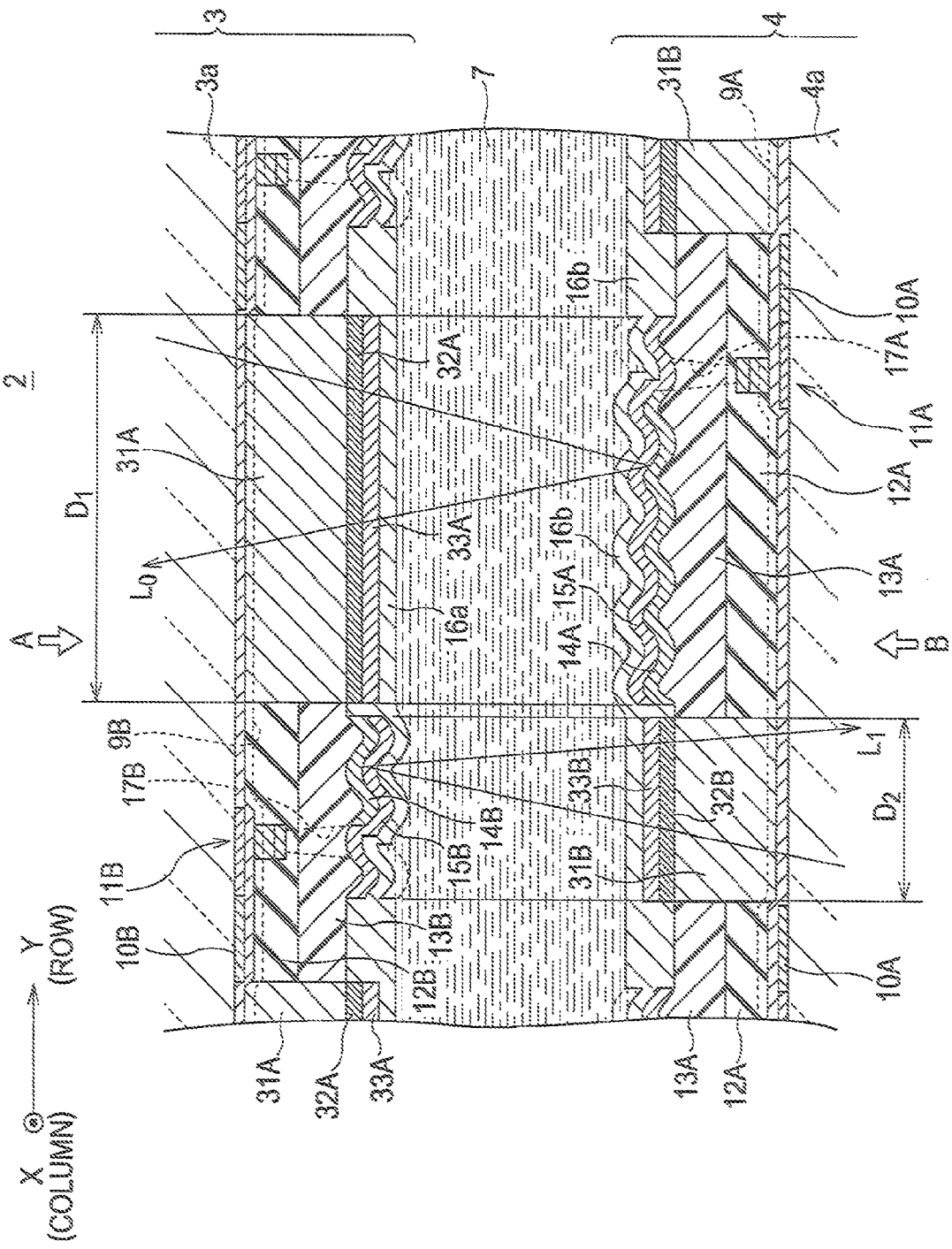
FIG. 3 is an enlarged cross-sectional view of the portion indicated by an arrow III of FIG. 2.

FIG. 1 is a plan view showing the structure of a liquid crystal device according to an embodiment of the invention. FIG. 2 is a cross-sectional view of the liquid crystal device taken along the line II-II of FIG. 1. FIG. 3 is an enlarged view of a portion indicated by an arrow III of FIG. 2.

Referring to FIG. 2, a liquid crystal device 1 includes a liquid crystal panel 2 and a wiring substrate (not shown) connected to the liquid crystal panel 2. For the liquid crystal device 1, the side indicated by an arrow A is the main viewing side for main display and the side indicated by an arrow B is the sub-viewing side for sub-display. In other words, the liquid crystal device 1 according to this embodiment has the double-sided display type liquid crystal panel 2 that displays images on the sides indicated by the arrows A and B.

The liquid crystal panel 2 has a pair of substrates 3 and 4 bonded through a ring-shaped sealing member 6 formed in a rectangular or square shape, seen from the direction of arrow A. The substrate 3 is disposed at the main viewing side indicated by the arrow A and a first display surface S1 is defined on the outer surface of the substrate 3. On the other hand, the substrate 4 is disposed at the sub-viewing side indicated by the arrow B and a second display surface S2 is defined on the outer surface of the substrate 4.

The substrate 3 has a first substrate, a first transmissive substrate 3a, which is formed in a rectangular or square shape, seen from the direction of arrow A. The first transmissive substrate 3a, for example, is formed of transmissive glass or transmissive plastic. A polarizing plate 8a is bonded to the outer surface of the first transmissive substrate 3a. Other than the polarizing plate 8a, an optical element, such as a retardation film, may be provided, if needed. On the other hand, the substrate 4 facing the substrate 3 has a second substrate, a second transmissive plate 4a, formed in a rectangular or square shape, seen from the direction of arrow B. The second transmissive substrate 4a is formed of transmissive glass or transmissive plastic for example. A polarizing plate 8b is bonded to the outer surface of the second transmissive substrate 4a. Other than the polarizing plate 8a, an optical element, such as a retardation film, may be provided, if needed.

The sealing member 6 provides a gap, that is, a cell gap G between the substrates 3 and 4. The sealing member 6 has a liquid crystal injection port (not shown) at a predetermined position and liquid crystal as an electro-optical material is injected in between the substrates 3 and 4 through the liquid crystal injection port. The injected liquid crystal forms an electro-optical material layer, that is, a liquid crystal layer 7, in the cell gap G. The liquid crystal injection port is sealed by a resin after the liquid crystal is completely injected. For the liquid crystal injection, other than through a liquid crystal injection port, liquid crystal may be provided in an area defined by the ring-shaped continuous sealing member 6 without a liquid crystal injection port, through a liquid crystal dropping process. Nematic liquid crystal having positive dielectric anisotropy may be used as the liquid crystal in this embodiment.

The width of the cell gap G, that is, the thickness of the liquid crystal layer 7 is maintained by a plurality of spacers (not shown) provided in the cell gap G. The spacers may be formed by disposing a plurality of spherical resin members ununiformly (irregularly) on the surface of the substrate 3 or 4. Further, the spacers may be formed into pillars at predetermined positions by photolithography.

Referring to FIG. 1, a plurality of regions D1 and D2 are defined on the liquid crystal panel 2. The regions denoted by D1 (represented by diagonal lines in FIG. 1) are first sub-pixels that are unit display regions for the first display surface S1 in FIG. 2. Further, the regions denoted by D2 in FIG. 1 are second sub-pixels that are unit display regions for the second display surface S2 in FIG. 2. The first sub-pixels D1 and the second sub-pixels D2 are the regions where pixel electrodes overlap strip electrodes (described later) and are the smallest display units. FIG. 1 is a plan view of the liquid crystal display of FIG. 2, seen from the direction of arrow A. In FIG. 1, the substrate 4 is disposed under the substrate 3 (that is, inside the figure). Accordingly, electrodes and wires in the liquid crystal panel 2 are substantially not exposed to outside of the substrate 3, but they are represented by solid lines in FIG. 1, for convenience.

A plurality of first sub-pixels D1 and second sub-pixels D2 are arranged in lines in a plane. In a first direction, the row direction X (that is, horizontal direction in FIG. 1), the first sub-pixels are arranged adjacent to each other. Further, the second sub-pixels D2 are also arranged adjacent to each other. On the other hand, in a second direction, the column direction Y (that is, vertical direction of FIG. 1), the first sub-pixels D1 and the second sub-pixels D2 are alternately arranged. That is, the lines of the first sub-pixels D1 arranged in the row direction X and the lines of the second sub-pixels D2 arranged in the same direction are alternately arranged in the column direction Y.

The internal structure of the liquid crystal panel 2 including the substrates 3 and 4 is described below in detail. In the liquid crystal device 1 of FIG. 2, the internal structure of the liquid crystal panel 2 is different at the first sub-pixels D1 and the second sub-pixels D2.

First, the internal structure of the liquid crystal panel 2 for the first sub-pixels D1 is described.

Figure 4:
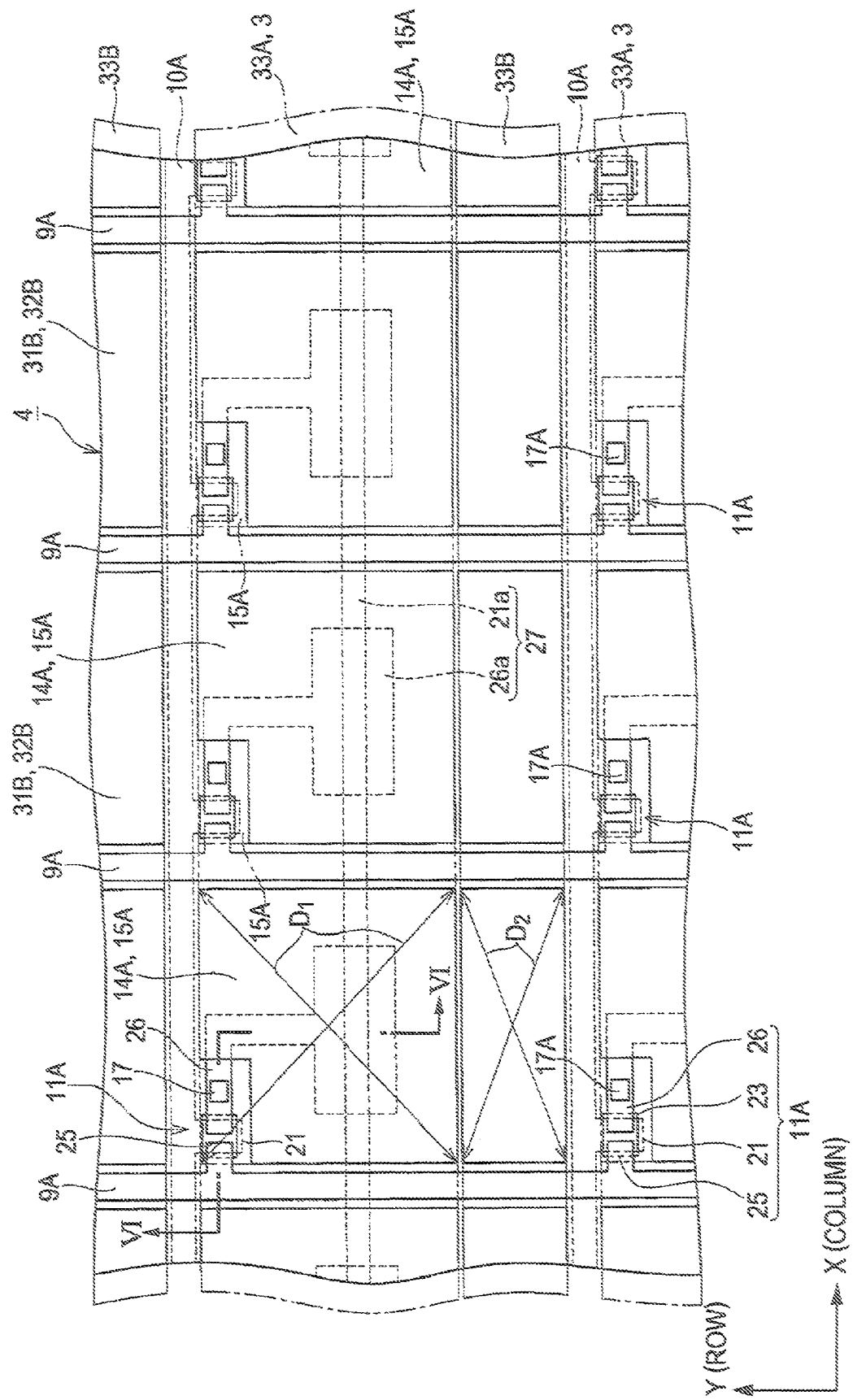
FIG. 4 is an enlarged plan view of a portion indicated by an arrow IV of FIG. 1, seen in the direction of arrow A of FIG. 3.
Figure 5:
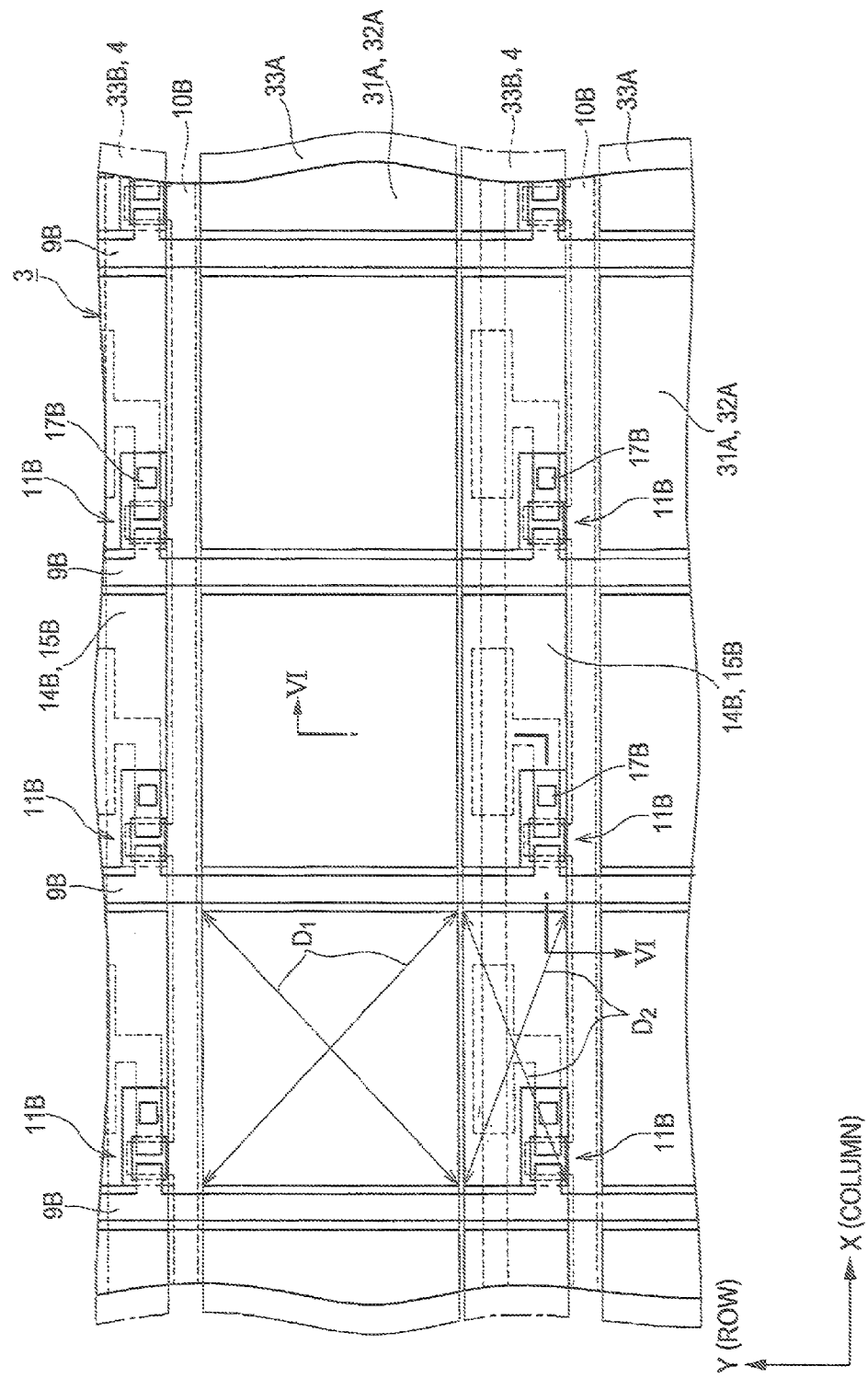
FIG. 5 is an enlarged plan view of a portion indicated by an arrow V of FIG. 1, seen in the direction of arrow 3 of FIG. 3.
Figure 6:
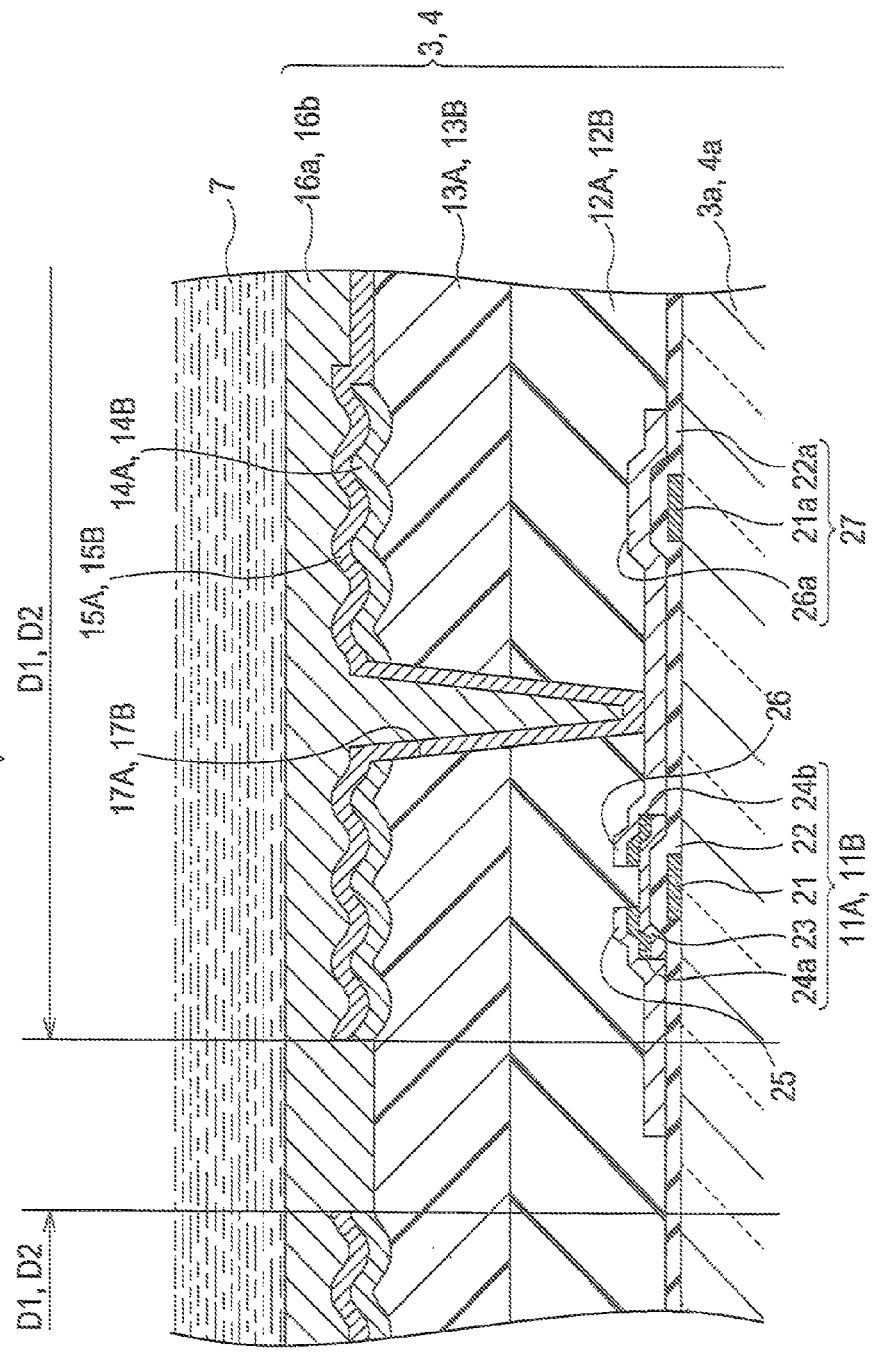
FIG. 6 is a cross-sectional view taken along the line VI-VI of FIG. 4.

FIGS. 4 and 5 are enlarged views of a portion indicated by an arrow IV, V of FIG. 1. FIG. 6 is a cross-sectional view taken along the line VI-VI of FIG. 4 or FIG. 5 and mainly shows TFT elements. FIG. 4 mainly shows a plan structure of the substrate 4, seen from the direction of arrow A of FIG. 3. FIG. 5 mainly shows a plan structure of the substrate 3, seen from the direction of arrow B of FIG. 3.

Referring to FIG. 3, source lines 9A extend in the column direction Y (that is, the horizontal direction of FIG. 3) on the inner surface of the second transmissive substrate 4a. Further, gate lines 10A extend in the row direction X (that is, direction perpendicular to the plane of FIG. 3). TFT elements 11A, active elements, functioning as switching elements are connected with the source lines 9A and the gate lines 10A. The source lines 9A function as data lines that transmit data signals to the TFT elements 11A. On the other hand, the gate lines 10A function as scanning lines that transmit scanning signals to the TFT elements 11A.

A protective film 12A is formed on the TFT elements 11A, the source lines 9A, and the gate lines 10A. A concavo-convex resin film 13A, an insulating film, is formed on the protective film 12A. Light reflecting films 14A are formed on the concavo-convex resin film 13A, transmissive pixel electrodes 15A are formed on the light reflecting films 14A, and an alignment film 16b is formed on the pixel electrodes 15A. The alignment film 16b undergoes alignment processing, for example rubbing, which determines initial alignment of liquid crystal molecules around the substrate 4.

In general, the protective film 12A is formed of a nitride film (SiN) having transmittance and insulation or a silicon dioxide film ($SiO_2$). Further, the concavo-convex resin film 13A is formed by patterning, for example, a resin having transmittance, photosensitivity, and insulation, such as an acrylic resin or a polyimide resin, through photolithography.

The light reflecting film 14A is formed by patterning a light reflective material, such as aluminum (Al) or aluminum alloy, through photo-etching. The pixel electrodes 15A are formed by patterning a metallic oxide, such as ITO (Indium Tin Oxide) through photo-etching. Further, the alignment film 16b is formed by applying, for example, polyimide using printing.

In FIG. 1, the light reflecting films 14A and the pixel electrodes 15A are formed into matrixes on the substrate 4 in the row direction X and the column direction Y. As shown in FIG. 4 as well, an enlarged view of the portion indicated by the arrow IV, the light reflecting films 14A and the pixel electrodes 15A are disposed around the crossing points of the source lines 9A and the gate lines 10A and connected to corresponding TFT elements.

Referring to FIG. 3, contact holes 17A, open through holes for electrically connecting the pixel electrodes 15A and the TFT elements 11A are formed in the protective film 12A and the concavo-convex resin film 13A. The contact holes 17A are disposed such that they do not overlap the element bodies of the TFT elements 11A, seen from the direction of arrow A, and overlap the pixel electrodes 15A.

The TFT elements 11A used in this embodiment are amorphous silicon TFTs and, as shown in FIG. 6, they have gate electrodes 21, gate insulating films 22, semiconductor films 23 formed of an amorphous silicon (a-Si), N+—Si films 24a, 24b, source electrodes 25, and drain electrodes 26. The TFT elements of this embodiment are each an H-channel-type TFT element 11A having a bottom gate structure and a single gate structure.

Auxiliary capacitors 27 are disposed slightly apart from the TFT elements 11A. The auxiliary capacitors 27 each prevents additional capacity for the corresponding pixel electrode 15A from excessively decreasing. Each of the auxiliary capacitors 27 consists of a first electrode 21a made of the same material in the same layer as the gate electrode 21, an insulating film 22a made of the same material in the same layer as the gate insulating film 22 and covering the first electrode 21a, and a second electrode 26a made of the same material in the same layer as the drain electrode 26 and covering the insulating film 22a. As shown in FIG. 4, the first electrodes 21a extend across the source lines 9A in parallel with the gate lines 10A. Further, each of the second electrodes 26a is formed in a rectangular shape with a large area.

Referring to FIG. 6, the drain electrode 26 is connected at an end thereof to the semiconductor film 23 through the N+—Si film 24b and the other thereof end extends to the second electrode 26a of the auxiliary capacitor 27. Further, the drain electrode 26 is electrically connected to the pixel electrode 15A through the contact hole 17A and the source electrode 25 branches off the source line 9A, as shown in FIG. 4. The gate electrode 21 branches off and extends from the gate line 10A extending perpendicular to the source line 9A.

Continuing to refer to FIG. 6, since an interlayer insulating film composed of the protective film 12A and the concavo-convex resin film 13A is formed under the pixel electrode 15A, the pixel electrode 15A and the TFT element 11A are formed in different layers. Accordingly, the surface of the substrate 3 can be effectively utilized as compared with when the pixel electrode 15A and the TFT element 11A are formed on the same layer. For example, when the layer of the pixel electrode 15A is independent of the layer of the TFT element 11A, it is possible to increase the area of the pixel electrode 15A, that is, the pixel area, without being influenced by the TFT element 11A. Therefore, clear display can be achieved from the liquid crystal device.

Returning to FIG. 3, a concavo-convex pattern is formed in each of the first sub-pixels D1 in the surface of the concavo-convex resin film 13A such that a plurality of concave portions and convex portions are ununiformly formed, seen from the direction of arrow A. The light reflecting film 14A is formed in a predetermined thickness on the concavo-convex resin film 13A with the concavo-convex pattern, so that it has the same shape as the concavo-convex pattern. Since the concavo-convex pattern is formed on the light reflecting film 14A, light L0 that reflects off the light reflecting film 14A is not specularly reflected but is appropriately dispersed or is made to have directivity.

Continuing to refer to FIG. 3, coloring films 31A included in color filters are formed on the inner surface of the first transmissive substrate 3a facing the substrate 4 within the first sub-pixels D1 and overcoat films 32A are formed on the coloring films 31A. Further, strip electrodes 33A, transmissive electrodes, are formed on the overcoat films 32A, and an alignment film 16a is formed on the strip electrodes 33A. The overcoat films 32A function as protective films for the color filters. The alignment film 16a is formed by applying, for example, polyimide using printing.

Each of the coloring films 31A is formed in a rectangular or square dot shape (that is, an island shape) as viewed in the direction of arrow A in each of one first sub-pixels D1. Further, the coloring films 31A are arranged into a matrix in the row direction X and the column direction Y, seen from the direction of arrow A.

Each of the coloring films 31A has optical characteristics such that it transmits one of red (R), green (G), and blue (B) light and the coloring films 31A of R, G, and B are disposed in lines in a predetermined arrangement, seen from the direction of arrow A, such as a strip arrangement, a mosaic arrangement, or a delta arrangement. The optical characteristics of the coloring film 31A are not limited to the three primary colors of R, G, and B in application and may transmit three primary colors of cyan C, magenta M, and yellow Y.

The strip electrodes 33A, for example, are formed, by patterning ITO into a predetermined strip shapes by photo-etching. Each of the strip electrodes 33A extends in the row direction X (horizontal direction in FIG. 4) as shown in FIG. 4. Further, a plurality of strip electrodes 33A are disposed parallel with each other in lines at predetermined intervals in the column direction Y (vertical direction in FIG. 4).

The dot-shaped pixel electrodes 15A arranged in lines on the substrate 4 in the row direction X and the strip electrodes 33A extending in the row direction X on the substrate 3 are overlapped in plan view. Accordingly, the first sub-pixels D1 of minimal display units are formed by the overlapping of the electrodes. Referring to FIG. 2, since the first sub-pixels D1 are arranged into a matrix in lines in the row direction X and the column direction Y in a plane, a first display region V1 is defined at the outside of the substrate 3 (the side indicated by the arrow A) and images, such as characters, numbers, and figures, are displayed in the first display region V1.

For the first display region V1, when images are displayed in color by the coloring films 31A of three colors of R, G, and B, a pixel is defined by three first sub-pixels D1 corresponding to three coloring films 31A for three colors of R, G, and B. On the other hand, when images are displayed in mono-color by black and white or two certain colors, a pixel is defined by one first sub-pixel D1.

The internal structure of the liquid crystal panel 2 corresponding to the second sub-pixel D2 is described below. In the second sub-pixel D2, as shown in FIG. 3, the components are disposed in reverse order to those on the substrates 3 and 4 in the first sub-pixel D1. In more detail, the components on the substrate 3 in the first sub-pixel D1 are formed on the substrate 4 in the second sub-pixel D2 and the components on the substrate 4 in the first sub-pixel D1 are formed on the substrate 3 in the second sub-pixel D2. The structure in the second sub-pixel D2 is the same as that of the first pixel D1, except the plan areas of the sub-pixel differ.

Referring to FIG. 3, source lines 9B extend in the column direction Y (that is, horizontal direction in FIG. 3) on the inner surface of the first transmissive substrate 3a. Further, gate lines 10B extend in the row direction X (that is, direction perpendicular to the plane of FIG. 3). TFT elements 11B, active elements functioning as switching elements, are formed in connection with the source lines 93 and the gate lines 10B in the second sub-pixels D2. Each of the TFT elements 11B has the same configuration as each of the TFT elements 11A shown in FIG. 6 and is not described in detail. The source lines 9B function as data lines that transmit data signals to the TFT elements 11B. On the other hand, the gate lines 10B function as scanning lines that transmit scanning signals to the TFT elements 11B.

A protective film 12B covers the TFT elements 11B, the source lines 9B, and the gate lines 10B. A concavo-convex resin film 13B, an insulating film, is formed on the protective film 12B, light reflecting films 14B are formed on the concavo-convex resin film 13B, pixel electrodes 15B, transmissive films, are formed on the light reflecting films 14B, and an alignment film 16a is formed on the pixel electrodes 15B. The alignment film 16a undergoes alignment processing, for example rubbing, which determines initial alignment of liquid crystal molecules around the substrate 3 in the second sub-pixels D2.

The protective film 12B, as the protective film 12A in the first sub-pixel D1, is formed of a nitride film (SiN) or a silicon dioxide film ($SiO_2$) having transmittance and insulation. Further, the concavo-convex resin film 13B, as the concavo-convex resin film 13A in the first sub-pixel D1, is formed, for example, by patterning a resin having transmittance, photosensitivity, and insulation, such as an acrylic resin or a polyimide resin, through photolithography. The light reflecting film 14B is formed, for example, by patterning aluminum by photo-etching. The pixel electrode 15B is formed, for example, by patterning ITO by photo-etching.

Referring to FIG. 1, the light reflecting films 14B and the pixel electrodes 15B are formed into matrixes in the row direction X and the column direction Y on the substrate 3. The light reflecting films 14B and the pixel electrodes 15B, as shown in FIG. 5 as well, an enlarged view of the portion indicated by the arrow V, are disposed around crossing points of the source lines 9B and the gate lines 10B and connected to corresponding TFT elements.

Referring to FIG. 3, the protective film 12B and the concavo-convex film 13B have contact holes 17B for electrically connecting the pixel electrodes 15B and the TFT elements 11B. The contact holes 17B are formed such that they do not overlap the element bodies of the TFT elements 11B and overlap the pixel electrodes 15B, in plan view seen from the direction of arrow B.

Referring to FIG. 3, a concavo-convex pattern is formed in the surface of the concavo-convex resin film 13B such that a plurality of concave portions and convex portions are ununiformly formed, in plan view seen from the direction of arrow A. The light reflecting film 14B is formed in a predetermined thickness on the concavo-convex resin film 13B with the concavo-convex pattern, so that it has the same shape as the concavo-convex pattern. Since the concavo-convex pattern is formed in the light reflecting film 14B, light L1 that reflects off the light reflecting film 14B is not specularly reflected but is appropriately dispersed or is made to have directivity.

In the second sub-pixel D2, coloring films 31B are formed on the inner surface facing the substrate 3 of the second transmissive substrate 4a, overcoat films 32B are formed on the coloring films 31B, strip electrodes 33B, transmissive electrodes, are formed on the overcoat films 32B, and an alignment film 16b is formed on the strip electrodes 33B. The overcoat film 32B functions as a protective film for a color filter.

Each of the coloring films 31B is formed into a rectangular or square dot shape (that is, island shape) in each of the second sub-pixels D2, seen from the direction of arrow B. Further, the coloring films 31B are arranged in a matrix in the row direction X and the column direction Y, seen from the direction of arrow 3.

Each of the coloring films 31B has optical characteristics such that it transmits one of red (R), green (G), and blue (B) light and the coloring films 31B of R, G, and B are disposed in lines into a predetermined arrangement, seen from the direction of arrow A, such as a strip arrangement, a mosaic arrangement, or a delta arrangement. The optical characteristics of the coloring film 31B are not limited to the three primary colors of R, G, and B in application and may transmit three primary colors of cyan C, magenta M, and yellow Y.

Referring to FIG. 3, the plurality of strip electrodes 33B is formed, for example, by patterning ITO in a predetermined strip shape by photo-etching. Each of the strip electrodes 33B, as shown in FIG. 5, extends in the row direction X (horizontal direction in FIG. 5). The plurality of strip electrodes 33B are arranged in parallel with each other in lines at predetermined intervals in the column direction Y (vertical direction in FIG. 5).

The dot-shaped pixel electrodes 15B arranged in lines on the substrate 3 in the row direction X and the strip electrodes 33B extending in the row direction X on the substrate 4 are overlapped in plan view. Accordingly, the second sub-pixels D2 of minimal display units are formed by the overlapping of the electrodes. Referring to FIG. 2, since the second sub-pixels D2 are arranged into a matrix in lines in the row direction X and the column direction Y in a plane, a second display region V2 is defined at the outside of the substrate 4 (the side indicated by the arrow B) and images, such as characters, numbers, and figures, are displayed in the second display region V2.

For the first display region V2 as well, when images are displayed in color by the coloring films 31B of three colors of R, G, and B, a pixel is defined by three second sub-pixels D2 corresponding to three coloring films 31B for three colors of R, G, and B. On the other hand, when images are displayed in mono-color by black and white or two certain colors, a pixel is defined by one second sub-pixel D2.

Referring to FIG. 2, the second transmissive substrate 4a of the substrate 4 has a protruding portion 35A that protrudes outside the substrate 3. Wires 36A are formed on the surface of the protruding portion 35A by photo-etching. When seen from the direction of arrow A, a plurality of wires 36A is provided and they are arranged in lines at predetermined intervals, perpendicular to the figure. Further, a plurality of external connecting terminals 37A is formed in lines at the edge of the protruding portion 35A, at predetermined intervals, perpendicular to the figure. For example, an FPC substrate (not shown) is connected to the edge of the protruding portion 35A where the external connecting terminals 37A are formed.

The wires 36A extend in the column direction Y into the region surrounded by a sealing member 6. The wires 36A function as data lines with portions of them connected directly to the source lines 9A on the substrate 4. Further, the other portions of the wires 36A are formed in a pattern that extends in the region surrounded by the sealing member 6 in the Y direction along the side of the substrate 4 and bends in the row direction X. The wires 36A of the pattern are directly connected to the gate lines 10A on the substrate 4 and function as scanning lines.

A driving IC 39A is mounted on the surface of the protruding portion 35A by a COG (Chip On Glass) technique using an ACF 38A (Anisotropic Conductive Film). The driving IC 39A transmits data signals to the source lines 9A and scanning signals to the gate lines 10A. The driving IC 39A may be formed of one IC chip or a plurality of IC chips, if needed. When the driving IC chip 39A is formed by a plurality of IC chips, the IC chips are arranged in lines on the protruding portion 35A in the horizontal direction in FIG. 1.

On the other hand, referring to FIG. 2, the first transmissive substrate 3a of the substrate 3 has a protruding portion 35B that protrudes outside the substrate 4. Wires 36B are formed on the surface of the protruding portion 35B by photo-etching. When seen from the direction of arrow A, the plurality of wires 36B is provided and they are arranged in lines at predetermined intervals, perpendicular to the figure. Further, a plurality of external connecting terminals 37B is formed in lines at the edge of the protruding portion 35B, at predetermined intervals, perpendicular to the figure. For example, an FPC substrate (not shown) is connected to the edge of the protruding portion 35B where the external connecting terminals 37B are formed.

The wires 36B extend in the column direction Y into the region surrounded by a sealing member 6. The wires 36B function as data lines with portions of them connected directly to the source lines 9B on the substrate 3. Further, the other portions of the wires 36B are formed in a pattern that extends in the region surrounded by the sealing member 6 in the Y direction along the side of the substrate 3 and bends in the row direction X. The wires 36B of the pattern are directly connected to the gate lines 10B on the substrate 3 and function as scanning lines.

A driving IC 39B is mounted on the surface of the protruding portion 35B by the COG (Chip On Glass) technique using an ACF 38B (Anisotropic Conductive Film). The driving IC 39B transmits data signals to the source lines 9B and scanning signals to the gate lines 10B. The driving IC 39B may be formed of one IC chip or a plurality of IC chips, if needed.

According to the liquid crystal device 1 of FIG. 2 having the above configurations, images are displayed in a reflective way on the main viewing side indicated by the arrow A and the sub-viewing side indicated by the arrow 3, using external light, such as sunlight or interior light.

Referring to FIG. 3, when images are displayed on the main viewing side, external light L0 entering the liquid crystal panel 2 through the substrates 3 in the direction of arrow A enters the substrate 4 through the liquid crystal layer 7 and then reflects off the light reflecting film 14A in each of the first sub-pixels D1 to the liquid crystal layer 7. While light is supplied to the liquid crystal layer 7, predetermined voltage that is specified by scanning signals and data signals is applied between the pixel electrodes 15A of the substrate 4 and the strip electrodes 33A of the substrate 3 and the alignment of the liquid crystal molecules in the liquid crystal layer 7 is controlled at each of the first sub-pixels D1. As a result, the light supplied to the liquid crystal layer 7 is modulated at each of the first sub-pixels D1. When the modulated light passes through the polarizing plate 8a of the substrate 3 (see FIG. 2), passing is regulated at each of the first sub-pixels D1 by the polarizing characteristics of the polarizing plate 8a, and characters, numbers, and figures are displayed on the surface of the substrate 3, which is visualized in the direction of arrow A.

On the other hand, when images are displayed on the sub-viewing side, external light L1 entering the liquid crystal panel 2 through the substrate 4 in the direction of arrow 3 enters the substrate 3 through the liquid crystal panel 7 and then reflects off the light reflecting film 14B in each of the second sub-pixels D2 to the liquid crystal layer 7. While the light is supplied to the liquid crystal layer 7, predetermined voltage that is specified by scanning signals and data signals is applied between the pixel electrodes 15B of the substrate 3 and the strip electrodes 33B of the substrate 4 and the alignment of the liquid crystal molecules in the liquid crystal layer 7 is controlled at each of the second sub-pixels D2. As a result, the light supplied to the liquid crystal layer 7 is modulated at each of the second sub-pixels D2. When the modulated light passes through the polarizing plate 8b of the substrate 4 (see FIG. 2), passing is regulated at each of the second sub-pixels D2 by the polarizing characteristics of the polarizing plate 8b, and images, such as characters, numbers, and figures, are displayed on the surface of the substrate 4, which is visualized in the direction of arrow B.

As described above, according to the liquid crystal device of this embodiment, for the liquid crystal panel 2 of FIG. 2, images can be displayed on the main viewing side indicated by the arrow A and the sub-viewing side indicated by the arrow B. In the liquid crystal device 1, images are formed on the surface S1 of the substrate 3 using the first sub-pixels D1 and on the surface S2 of the substrate 4 using the second sub-pixels D2, so that a liquid crystal device that can display image on both sides is achievable using a liquid crystal panel 2 formed of two substrates, the substrates 3 and 4. Therefore, it is possible to reduce the overall thickness of a liquid crystal device, as compared with liquid crystal devices that display images on both sides of the front and rear surfaces using two liquid crystal panels in the related art.

According to this embodiment, as shown in FIG. 4, the first sub-pixels D1 and the second sub-pixels D2 are different in size. In detail, the area of each of the first sub-pixels D1 is larger than that of each of the second sub-pixels D2. In general, in a liquid crystal device that displays images on both sides, main display is performed on a display side and sub-display is performed on the other side. It is preferable to increase precision for display in the main display relative to the sub-display. Therefore, according to the liquid crystal device of this embodiment, since the first sub-pixels D1 are larger than the second sub-pixels D2 in area, it is possible to increase the display precision on the first display surface S1 for main display at the surface of the substrate 3, as compared with that on the second display surface S2 for sub-display at the surface of the substrate 4.

Further, according to this embodiment, as shown in FIG. 1, in the row direction X (that is, horizontal direction in FIG. 1), the first sub-pixels D1 are arranged adjacent to each other and the second sub-pixels D2 are also arranged adjacent to each other. Further, in the column direction Y (that is, vertical direction in FIG. 1), the first sub-pixels D1 and the second sub-pixels D2 are alternately arranged. Therefore, it is possible to effectively arrange the first sub-pixels D1 and the second sub-pixels D2 in the plan regions of the display regions V1 and V2 of FIG. 2. As a consequence, it is possible to make the display regions V1 and V2 wide, because they do not lean to one side.

Second Embodiment of Liquid Crystal Device

Figure 7:
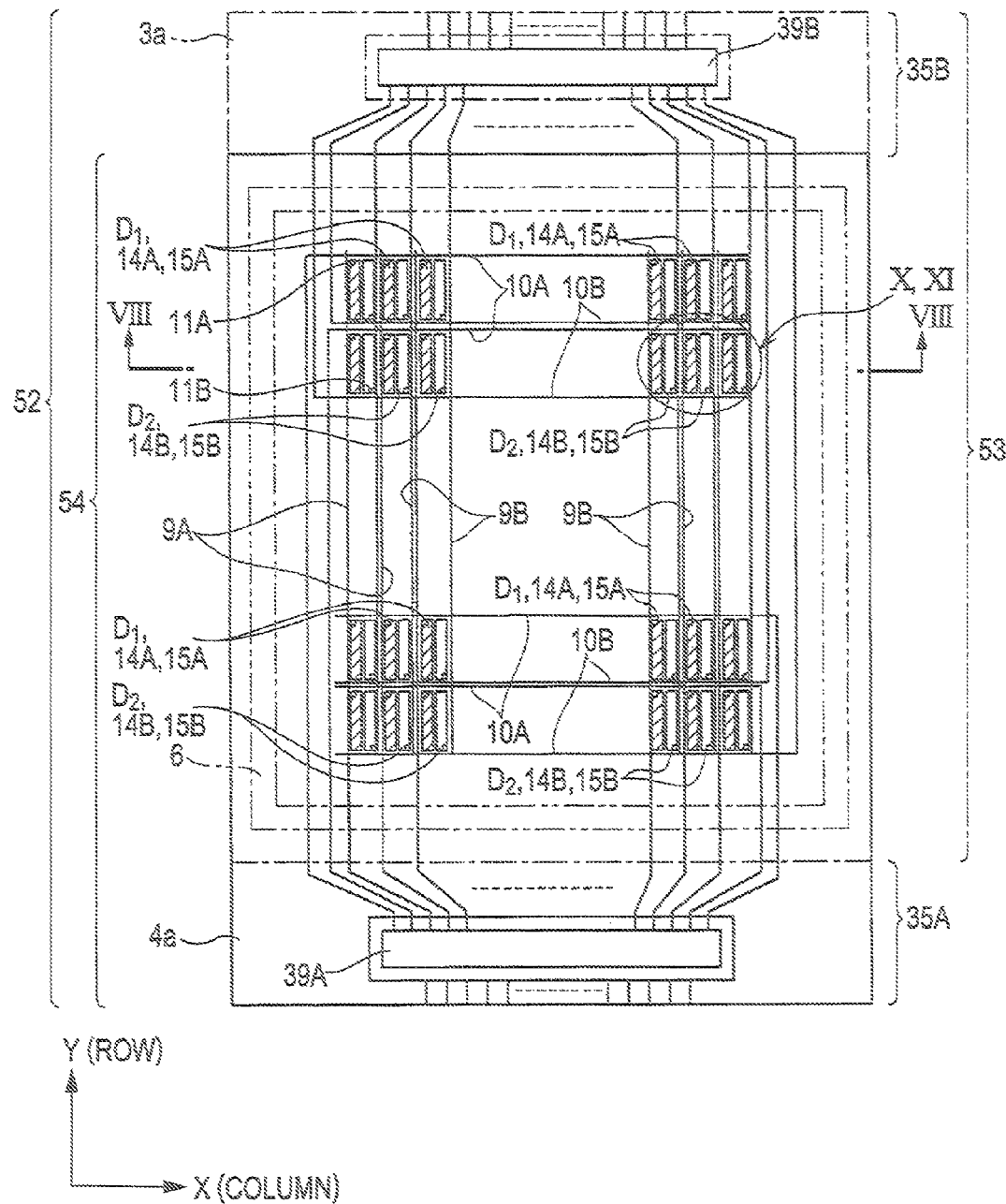
FIG. 7 is a plan view of a liquid crystal device according to another embodiment of the invention.
Figure 8:
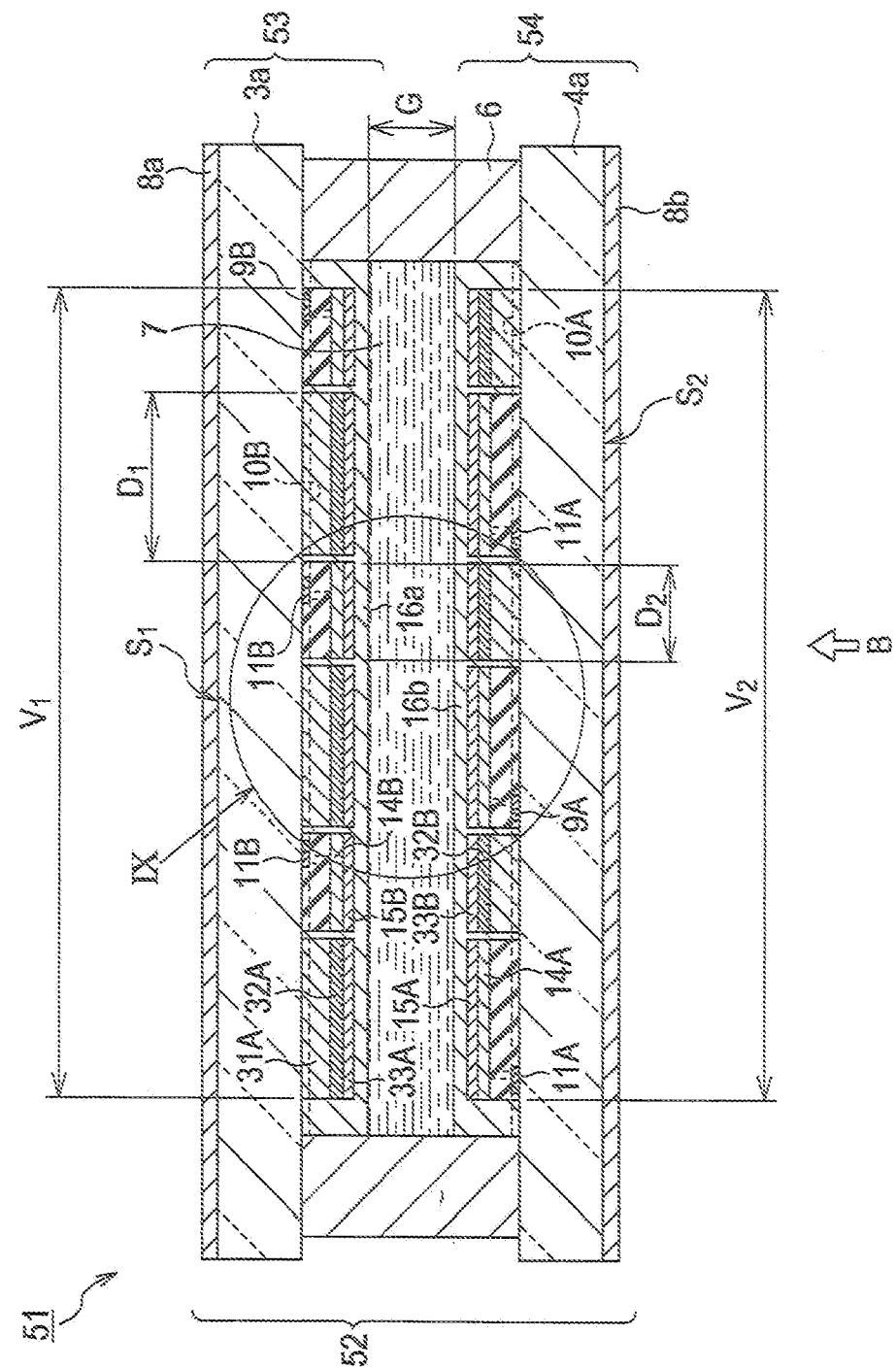
FIG. 8 is a cross-sectional view taken along the line VIII-VIII of FIG. 7.
Figure 9:
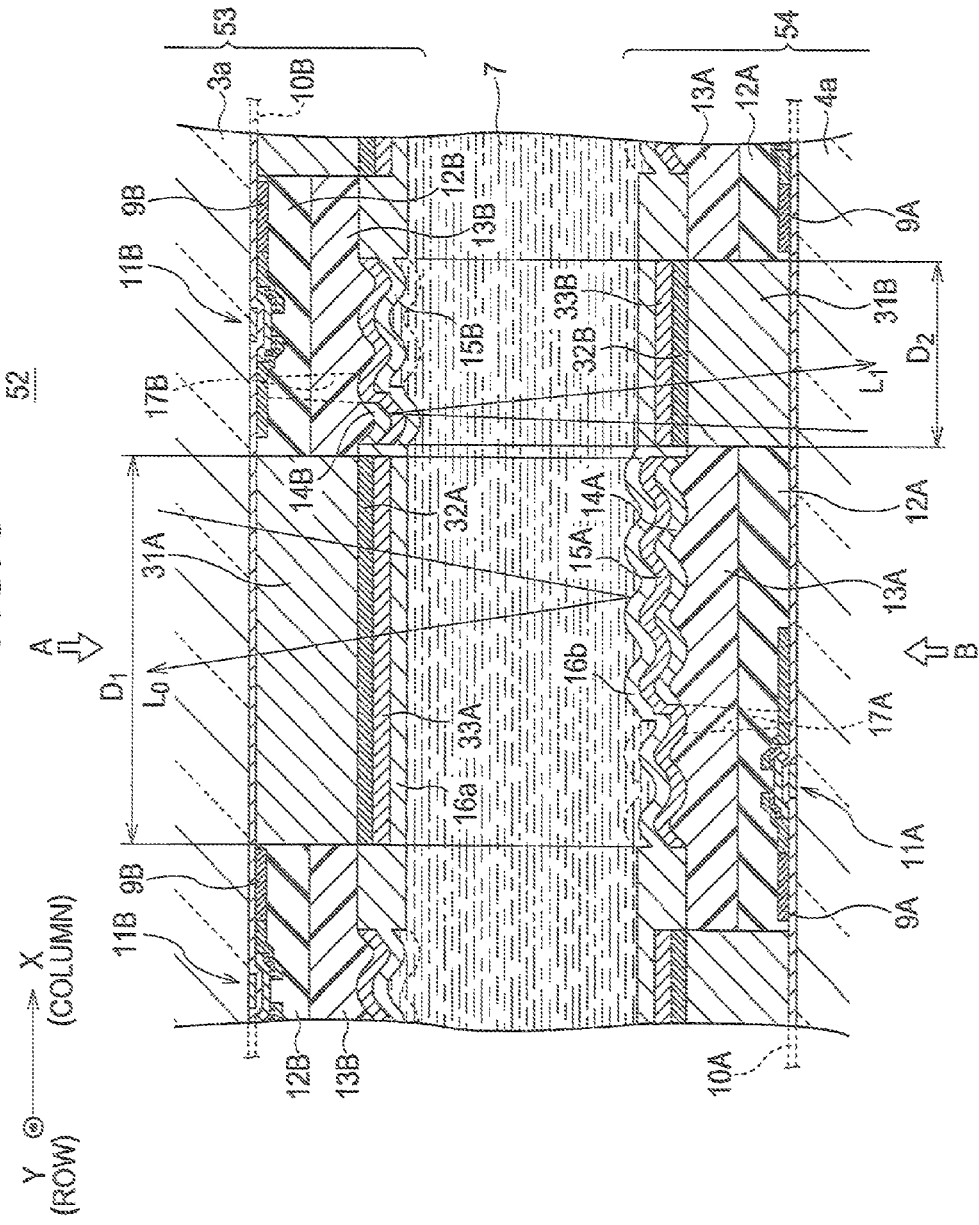
FIG. 9 is an enlarged cross-sectional view of the portion indicated by an arrow IX of FIG. 8.
Figure 10:
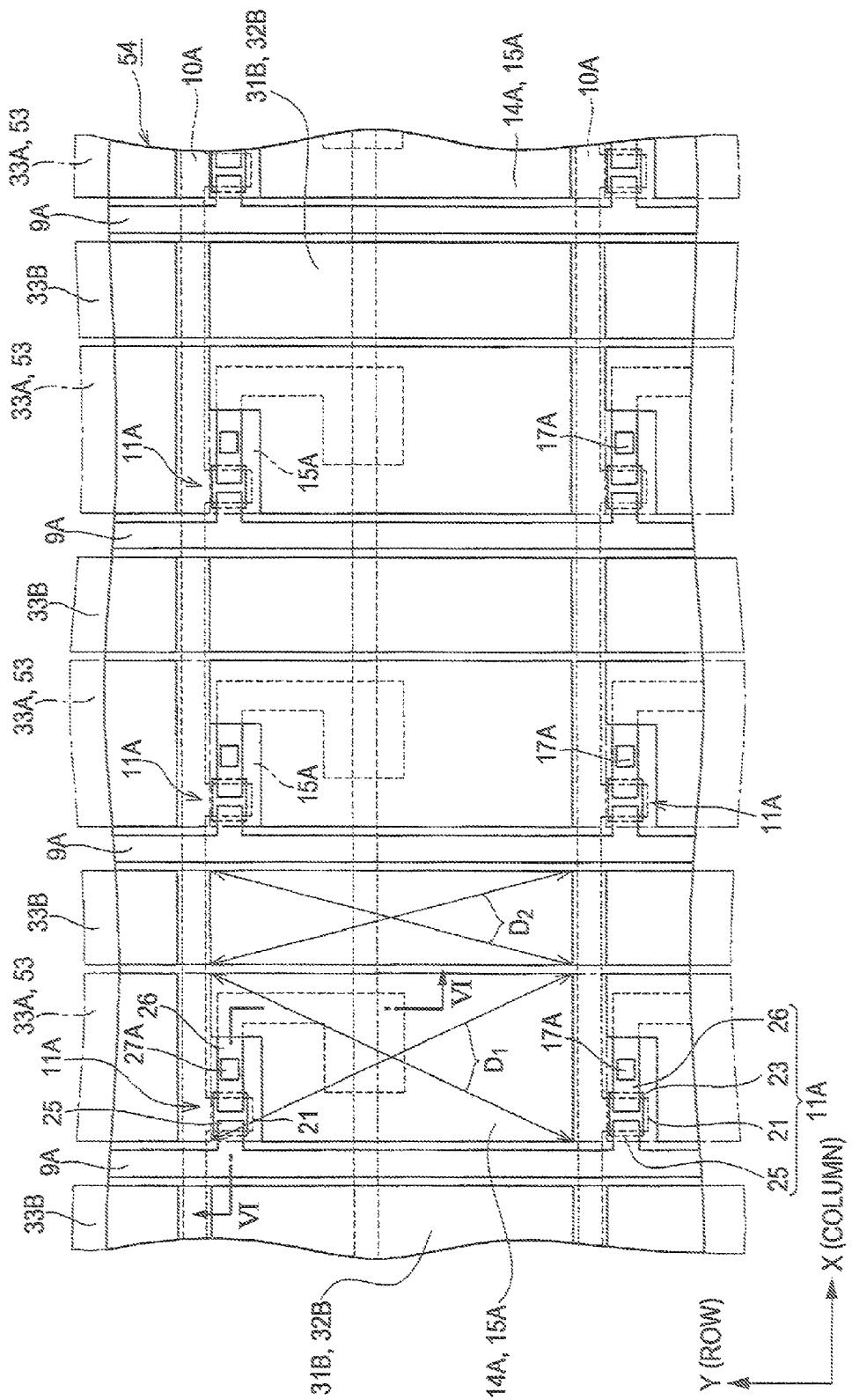
FIG. 10 is an enlarged plan view of a portion indicated by an arrow X of FIG. 7, seen from the direction of arrow A of FIG. 3.
Figure 11:
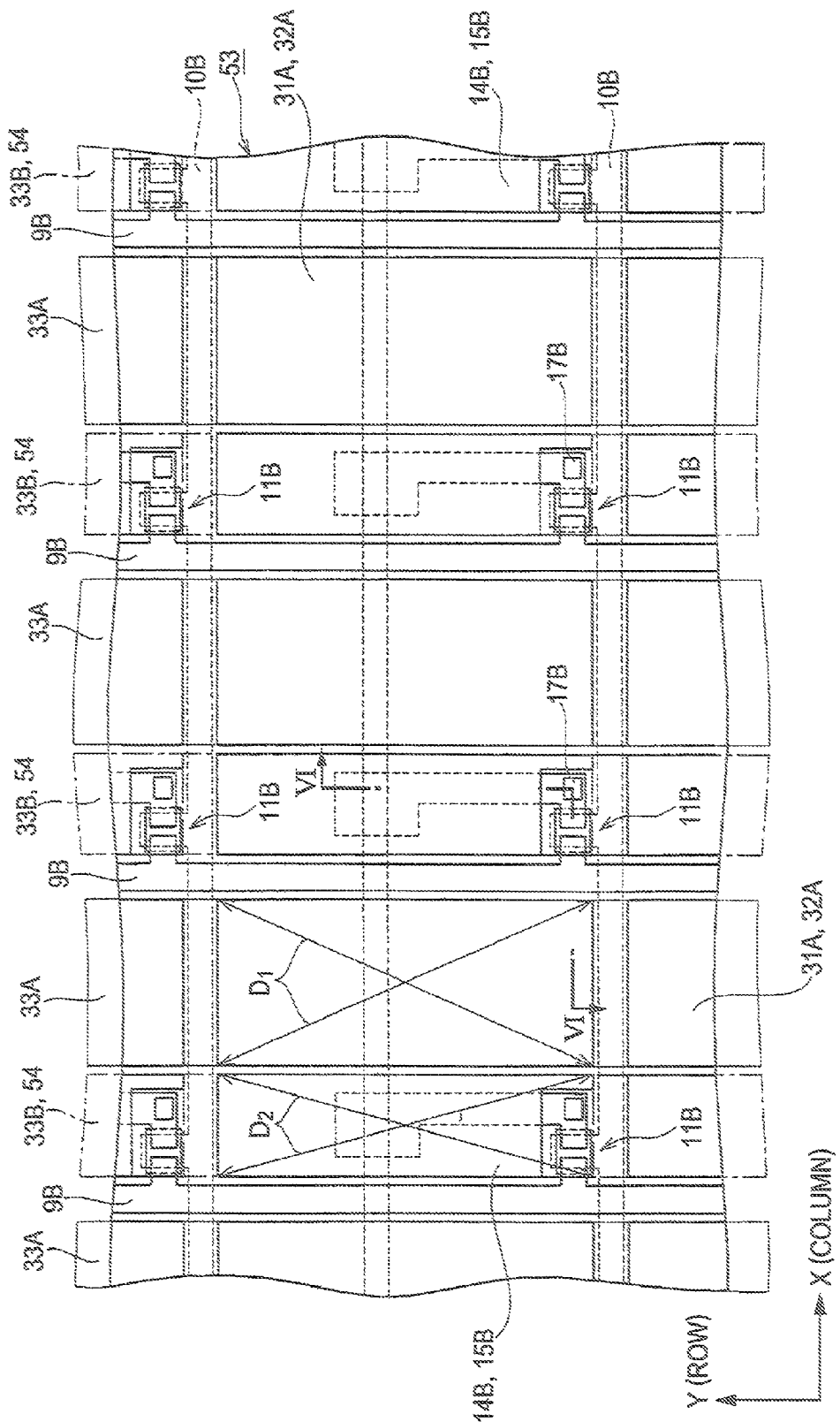
FIG. 11 is an enlarged plan view of a portion indicated by an arrow XI of FIG. 7, seen from the direction of arrow B of FIG. 9.

Next, a liquid crystal device according to another embodiment of the invention is described below. FIG. 7 is a plan view illustrating the structure of a liquid crystal device 51 according to this embodiment. FIG. 8 is a cross-sectional view illustrating the structure, taken along the line VIII-VIII of FIG. 7. FIG. 9 is an enlarge view of the portion indicated by the arrow IX of FIG. 8. FIGS. 10 and 11 are enlarged views of the portion indicated by the arrow X, XI of FIG. 7. Further, FIG. 10 shows the main plan structure of a substrate 54, seen from the direction of arrow A of FIG. 9. FIG. 11 shows the main plan structure of a substrate 53, seen from the direction of arrow B of FIG. 9.

The configuration of a liquid crystal device 51 of FIG. 7 according to this embodiment is the same as the liquid crystal device 1 shown in FIG. 1, except for the arrangement of the first sub-pixels D1 and the second sub-pixels B2 in the region surrounded the sealing member 6. The arrangement of the first sub-pixels D1 and the second sub-pixels D2 takes the central place in following description for the liquid crystal device 51. Further, since the embodiment shown in FIG. 7 has the same components as the embodiment shown in FIG. 1, the same components are denoted by the same reference numerals and not described.

Referring to FIG. 8, the liquid crystal device 51 includes a liquid crystal panel 52 and a wiring substrate (not shown) connected with the liquid crystal panel 52. In the liquid crystal device 51, the side indicated by the arrow A is the main viewing side and the side indicated by the arrow B is the sub-viewing side. That is, the liquid crystal device 51 according to this embodiment is a liquid crystal device equipped with the double-sided display type liquid crystal panel 52 that displays images on both sides indicated by the arrows A and B.

The liquid crystal panel 52 has a pair of substrates 53, 54 that are bonded by the ring-shaped sealing member 6 that is rectangle or a square, seen from the direction of arrow A. The substrate 53 is disposed at the main viewing side indicated by the arrow A and a first display surface S1 is defined on the outer surface of the substrate 53. On the other hand, the substrate 54 is disposed at the sub-viewing side indicated by the arrow B and a second display surface S2 is defined on the outer surface of the substrate 54.

As shown in FIG. 7, a plurality of first sub-pixels D1 and second sub-pixels D2 are defined in the liquid crystal panel 52. The first sub-pixels D1 and second sub-pixels D2 are arranged in lines in a plane. The first sub-pixels D1 are the region represented by diagonal lines in FIG. 7.

The liquid crystal device 51 according to this embodiment is different from the liquid crystal device 1 of FIG. 1 in the arrangement of the first sub-pixels D1 and second sub-pixels D2. In detail, the first sub-pixels D1 are arranged adjacent to each other in a second direction, column direction Y (that is, vertical direction in FIG. 7). Further, the second sub-pixels D2 are also arranged adjacent to each other in the column direction Y. On the other hand, the first sub-pixels D1 and second sub-pixels D2 are alternately arranged in a first direction, row direction X (that is, horizontal direction in FIG. 7). That is, the lines of first sub-pixels D1 arranged in the column direction Y and the lines of second sub-pixels D2 arranged in the column direction Y are alternately disposed in the row direction X.

Referring to FIG. 9, the layer structure inside the liquid crystal panel 52 corresponding to the first sub-pixels D1 is the same as that for the first sub-pixels D1 in the liquid crystal panel 2 shown in FIG. 3. In detail, as shown in FIG. 9, source lines 9A extend in the column direction Y (that is, direction perpendicular to the plane of FIG. 9) on the inner surface of the second transmissive substrate 4a. Further, gate lines 10A extend in the row direction X (that is, horizontal direction in FIG. 9) on the inner surface of a second transmissive substrate 4a. TFT elements 11A are formed in connection with the source lines 9A and the gate lines 10A. For the TFT elements 11A used for the liquid crystal device 51 according to this embodiment is the same, in the cross-sectional structure taken along the line VI-VI of FIG. 10, as the TFT elements 11A in associated with the above embodiment shown in FIG. 6, so that it is not described.

A protective film 12A is formed on the TFT elements 11A, the source lines 9A, and the gate lines 10A, a concavo-convex film 13A, an insulating film, is formed on the protective film 12A, light reflecting films 14A are formed on the concavo-convex film 13A, pixel electrodes 15A, transmissive electrodes, are formed on the light reflecting films 14A, and an alignment film 16b is formed on the pixel electrodes 15A.

Referring to FIG. 7, the light reflecting films 14A and the pixel electrodes 15A are formed in a matrix on the substrate 54 in the row direction X and the column direction Y. The light reflecting films 14A and the pixel electrodes 15A, as shown in FIG. 10 as well, an enlarged view of the portion indicated by the arrow X, are disposed around the cross positions of the source lines 9A and the gate lines 10A, and connected to corresponding TFT elements 11A. Further, referring to FIG. 9, contact holes 17A, open through holes for electrically connecting the pixel electrodes 15A and the TFT elements 11A are formed in the protective film 12A and the concavo-convex resin film 13A. The contact holes 17A are disposed such that they do not overlap the element bodies of the TFT elements 11A but overlap the pixel electrodes 15A, in plan view seen from the direction of arrow A.

Continuing with FIG. 9, coloring films 31A included in color filters are formed on the inner surface of the first transmissive substrate 3a facing the substrate 54 within the first sub-pixels D1 and overcoat films 32A are formed on the coloring films 31A. Further, strip electrodes 33A, transmissive electrodes, are formed on the overcoat films 32A, and an alignment film 16a is formed on the strip electrodes 33A.

The strip electrodes 33A in this embodiment, as show in FIG. 10, extend in the column direction Y (that is, vertical direction in FIG. 10). A plurality of strip electrodes 33A is disposed parallel with each other in lines at predetermined intervals in the column direction Y (horizontal direction in FIG. 10). The dot-shaped pixel electrodes 15A arranged in lines on the substrate 54 in the column direction Y and the strip electrodes 33A extending in the column direction Y on the substrate 53 are overlapped in plan view. Accordingly, the first sub-pixels D1, minimal units for display, are formed by the overlapping of the electrodes. Referring to FIG. 3, since the first sub-pixels D1 are arranged into a matrix in lines in the row direction X and the column direction Y in a plane, a first display region V1 is formed at the outside of the substrate 53 (the side indicated by the arrow A) and images, such as characters, numbers, and figures, are displayed in the first display region V1.

Referring to FIG. 9, the layer structure inside the liquid crystal panel 52 corresponding to the second sub-pixels D2 is the same as that for the second sub-pixels D2 in the liquid crystal panel 2 shown in FIG. 3. In detail, as shown in FIG. 9, source lines 9B extend in the column direction Y (that is, direction perpendicular to the plane of FIG. 9) on the inner surface of the first transmissive substrate 3a. Further, gate lines 10B extend in the row direction X (that is, horizontal direction in FIG. 9). The TFT elements 11B are formed in connection with the source lines 9B and the gate lines 10B. The TFT elements 11B is the same, in the cross-sectional structure taken along the line VI-VI of FIG. 11, as the TFT elements 11A in associated with the above embodiment shown in FIG. 6, so that it is not described.

A protective film 12B is formed on the TFT elements 11B, the source lines 9B, and the gate lines 10B, the concavo-convex film 13B, an insulating film, is formed on the protective film 12b, light reflecting films 14B are formed on the concavo-convex film 13B, pixel electrodes 15B, transmissive electrodes, are formed on the light reflecting films 14B, and an alignment film 16b is formed on the pixel electrodes 15B.

Referring to FIG. 7, the light reflecting films 14B and the pixel electrodes 15B are formed in a matrix on the substrate 53 in the row direction X and the column direction Y. The light reflecting films 14B and the pixel electrodes 15b, as shown in FIG. 11 as well, an enlarged view of the portion indicated by the arrow XI, are disposed around the cross positions of the source lines 9B and the gate lines 10B, and connected to corresponding TFT elements 11B. Further, referring to FIG. 9, contact holes 17B for electrically connecting the pixel electrodes 15B and the TFT elements 11B are formed in the protective film 12B and the concavo-convex resin film 13B. The contact holes 17B are disposed such that they do not overlap the element bodies of the TFT elements 11B but overlap the pixel electrodes 15B, in plan view seen from the direction of arrow 3.

In the second sub-pixels D2, the coloring films 31B are formed on the inner surface of the second transmissive substrate 4a facing the substrate 53 and the overcoat films 32B are formed on the coloring films 31B. Further, the strip electrodes 33B as transmissive electrodes are formed on the overcoat films 32B and the alignment film 16b are formed on the strip electrodes 33B.

The strip electrodes 33B according to this embodiment, as show in FIG. 11, extend in the column direction Y (that is, vertical direction in FIG. 11). The plurality of strip electrodes 33B is disposed parallel with each other in lines at predetermined intervals in the row direction X (horizontal direction in FIG. 11). The dot-shaped pixel electrodes 15B arranged in lines on the substrate 53 in the column direction Y and the strip electrodes 33B extending in the column direction Y on the substrate 54 are overlapped in plan view. Accordingly, the second sub-pixels D2, minimal units for display, are formed by the overlapping of the electrodes. Referring to FIG. 8, since the second sub-pixels D2 are arranged into a matrix in lines in the row direction X and the column direction Y in a plane, a second display region V2 is formed at the outside of the substrate 54 (the side indicated by the arrow B) and images, such as characters, numbers, and figures, are displayed in the second display region V2.

According to the liquid crystal device 51 shown in FIG. 7 in association with this embodiment as well, in the liquid crystal panel 52 of FIG. 8, it is possible to display images on both side of the main viewing side indicated by the arrow A and the sub-viewing side indicated by the arrow B. According to the liquid crystal device 51, images are formed on the surface of the substrate 53 using the first sub-pixels D1 and on the surface of the substrate 54 using the second sub-pixels D2, so that a double-sided display liquid crystal device is achievable using the liquid crystal panel 52 consisting of two substrates 53 and 54. As a result, it is possible to reduce the overall thickness of a liquid crystal device, as compared with liquid crystal devices that display images on both sides of the front and rear surfaces using two liquid crystal panels in the related art.

According to this embodiment, as shown in FIG. 10, the first sub-pixels D1 and the second sub-pixels D2 are different in size. In detail, the area of each of the first sub-pixels D1 is larger than that of each of the second sub-pixels D2. Therefore, it is possible to increase the display precision on the first display surface S1 for main display at the surface of the substrate 53, as compared with that on the second display surface S2 for sub-display at the surface of the substrate 54.

According to this embodiment, as shown in FIG. 7, in the column direction Y (that is, vertical direction in FIG. 7), the first sub-pixels D1 are arranged adjacent to each other and the second sub-pixels D2 are also arranged adjacent to each other. Further, in the row direction X (that is, horizontal direction in FIG. 7), the first sub-pixels D1 and the second sub-pixels D2 are alternately arranged. Therefore, it is possible to effectively arrange the first sub-pixels D1 and the second sub-pixels D2 in the plan regions of the display regions V1 and V2 of FIG. 8. As a consequence, it is possible to make the display regions V1 and V2 wide, because they do not lean to one side.

Other Embodiments

The invention was described in the above through preferred embodiments, but the invention is not limited thereto and may be modified in a variety of ways within the aspects described in claims.

For example, in the each of the above embodiments, the invention was applied to a liquid crystal device that uses amorphous silicon TFT elements having a H-channel-type single gate structure, three-terminal switching elements, as the switching elements. However, the invention is applicable to liquid crystal devices equipped with other structured amorphous silicon TFTs. Further, the invention is also applicable to active-matrix-type liquid crystal devices that use other TFT elements, such as high-temperature polysilicon TFT elements or low-temperature polysilicon TFT elements, as the switching elements, than the amorphous silicon TFT elements.

Further, the invention is also applicable to liquid crystal devices that use TFD (Thin Film Diode) elements, two terminal switching elements, as the switching elements.

In the above embodiments, as shown in FIGS. 3 and 9, the invention was applied to liquid crystal devices that display images in full colors using the coloring films 31A of three colors R, G, and B or the coloring films 31B of three colors R, G, and B. However, the invention is also applicable to liquid crystal devices that display images in mono color using color films of one color. Further, the invention is applicable to liquid crystal devices that display images in black and white, without a color film.

Furthermore, in the above embodiments, the invention was applied to active-matrix-type liquid crystal devices that use switching elements. However, the invention is also applicable to passive-matrix-type liquid crystal devices that do not use switching elements.

Embodiment of Electronic Apparatus

An electronic apparatus according to an embodiment of the invention is described hereafter. The following embodiment is not more than an example of the invention and the invention is not limited to the embodiment.

Figure 12:
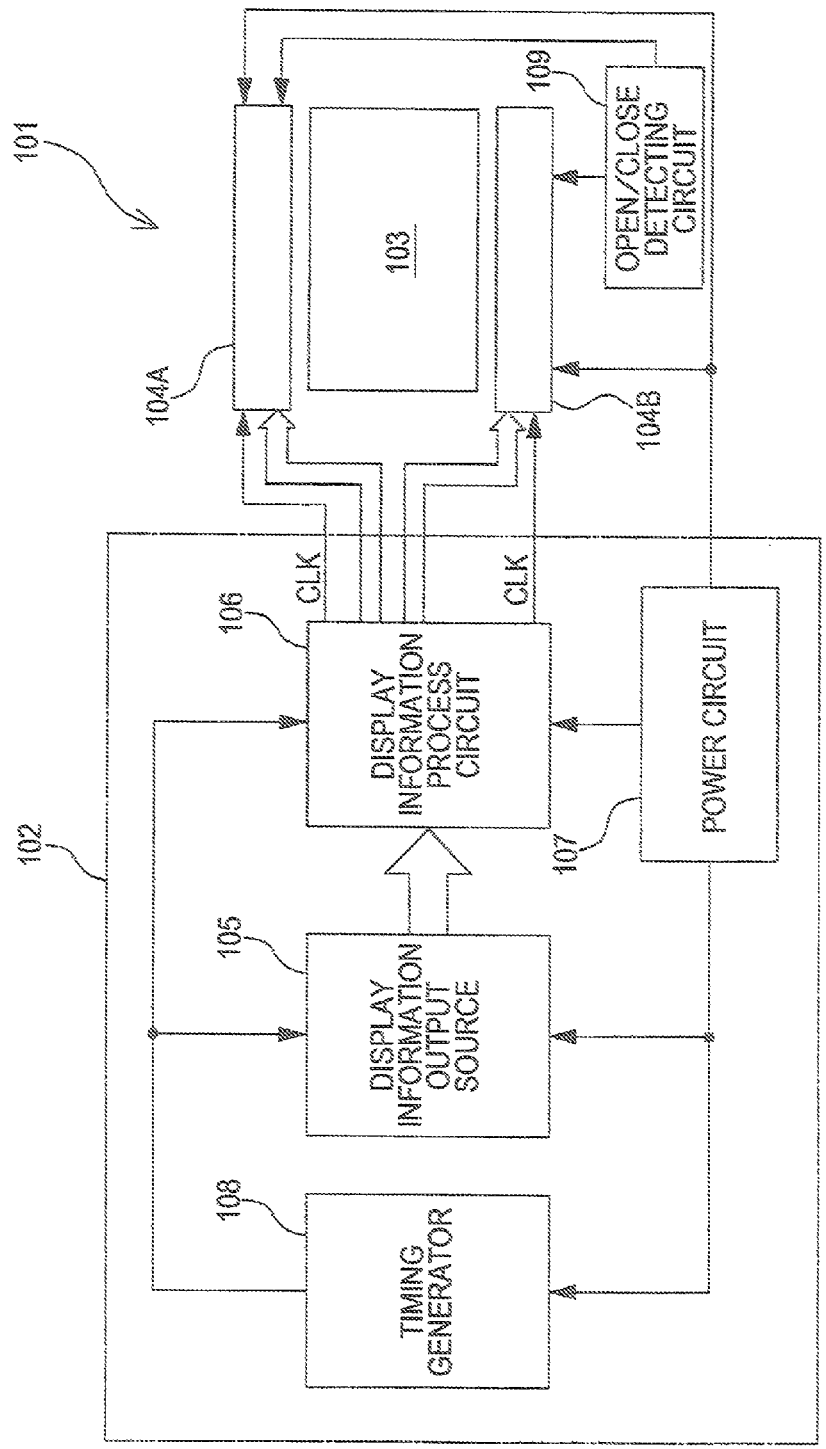
FIG. 12 is a block diagram illustrating an electronic apparatus according to an embodiment of the invention.

FIG. 12 is a block diagram illustrating an electronic apparatus according to an embodiment of the invention. FIG. 13 shows a foldable mobile phone, an example of the electronic apparatus illustrated in the block diagram of FIG. 12. An electronic apparatus shown in FIG. 12 includes a liquid crystal device 101 and a control circuit 102 that controls the liquid crystal device 101. The control circuit 102 includes a display information output source 105, a display information process circuit 106, a power circuit 107, and a timing generator 108. The liquid crystal device 101 includes a liquid crystal panel 103, a first driving circuit 104A, and a second driving circuit 104B.

The display information output source 105 has a memory such as ROM (Read Only Memory) or RAM (Random Access Memory), a storage unit such as various discs, or a turning circuit that synchronizes and outputs digital image signals, and supplies display information image signals in a predetermined format to the display information process circuit 106, on the basis of a variety of block signals generated by the timing generator 108.

The display information process circuit 106 has a variety of known circuits, such as an amplifying/inverting circuit, a rotation circuit, a gamma compensation circuit, or a clamp circuit, processes inputted display information, and supplies image signals together with clock signals CLK to the driving circuit 104A or 104B. The driving circuit 104A or 104B is a general term for an inspection circuit, including a scan line driving circuit or a data line driving circuit. Further, the power circuit 107 supplies a predetermined power voltage to each of the components.

Figure 13A:
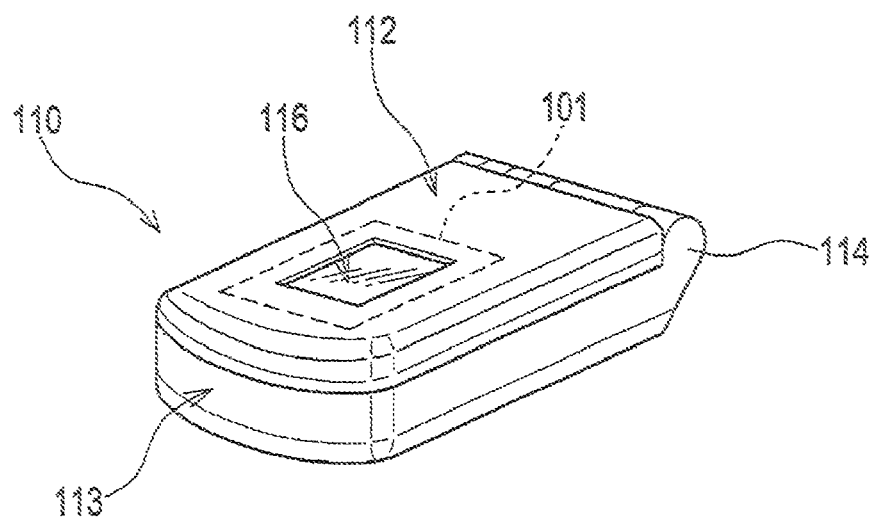
FIG. 13A is a view showing the external shape of the electronic apparatus of FIG. 12 closed.
Figure 13B:
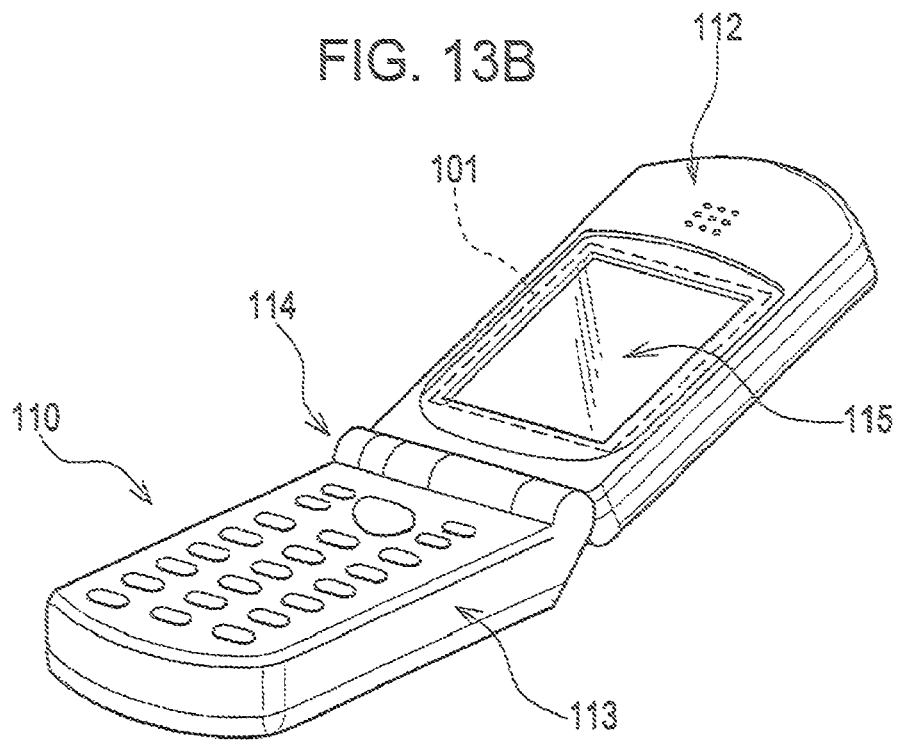
FIG. 13B is a view showing the external shape of the electronic apparatus of FIG. 12 open.

The electronic apparatus illustrated by the block diagram in FIG. 12 may be the foldable mobile phone 110 shown in FIGS. 13A and 13B. A display body 112 equipped with the liquid crystal panel 101 is foldably connected to an operational body 113 through a hinge 114 in the mobile phone 110. The liquid crystal panel 101 is a liquid crystal panel that is operable to display images on both front and rear surfaces. The liquid crystal panel 101 operates as a main display portion 115 for main display when the display body 112 is open. Further, the liquid crystal panel 101 operates as a sub-display portion 116 for sub-display when the display body 112 is folded on the operational body 113.

Displaying images on the main display portion 115 or the sub-display portion 116 depends on folding of the mobile phone 110. Accordingly, as shown in FIG. 12, the electronic apparatus includes an open/close detecting circuit 109 that detects folding of the mobile phone 110. The open/close detecting circuit 109 outputs detected results to the liquid crystal device 101.

The liquid crystal device 101 of FIG. 12 may be the liquid crystal device 1 shown in FIG. 1 or the liquid crystal device 51 shown in FIG. 7. According to the liquid crystal devices 1 and 51, since images are formed on the surface of the substrate 3 using the first sub-pixels D1 and on the surface of the substrate 4 using the second sub-pixels D2, it is possible to display images on both sides with the liquid crystal panel 2 consisting of the two substrates 3 and 4. As a result, it is possible to reduce the overall thickness of a liquid crystal device, as compared with liquid crystal devices that display images on both sides of the front and rear surfaces using two liquid crystal panels in the related art. Accordingly, the mobile phone 110 shown in FIGS. 13A and 13B that is equipped with the liquid crystal device can also decrease in thickness.

Modification

Other than the above-mentioned mobile phone, examples of the electronic apparatus include a personal computer, a liquid crystal television set, a view-finder-type or monitor-direct-viewing-type video tape recorder, a car navigation, a pager, an electronic notebook, an electronic calculator, a word process, a workstation, a videophone, and a POS terminal.

The entire disclosure of Japanese Patent Application No. 2006-157007, filed Jun. 6, 2006 is expressly incorporated by reference herein.

What is claimed is:

1. A liquid crystal device comprising:
a first substrate and a second substrate that face each other;
a liquid crystal layer that is interposed between the first substrate and the second substrate;
first light reflecting films that are selectively provided on a side of the first substrate facing the liquid crystal layer and that reflect light entering from the second substrate;
active elements that are formed on the first substrate and the second substrate within a display area;
second light reflecting films that are selectively provided on a side of the second substrate facing the liquid crystal layer, corresponding to a plurality of regions of the first substrate where the first light reflecting films are not provided and that reflect light entering from the first substrate;
first transmissive electrodes that are selectively provided in the regions of the side of the first substrate facing the liquid crystal layer where the first light reflecting films are not provided;
second transmissive electrodes that are selectively provided in a plurality of regions of the side of the second substrate facing the liquid crystal layer where the second light reflecting films are not provided;
first coloring films that are selectively provided in the regions of the side of the first substrate facing the liquid crystal layer where the first light reflecting films are not provided, wherein the first coloring films are formed between the first substrate and the first transmissive electrodes;
second coloring films that are selectively provided in the regions of the side of the second substrate facing the liquid crystal layer where the second light reflecting films are not provided, wherein the second coloring films are formed between the second substrate and the second transmissive electrodes;
wherein the active elements are formed in a region where the first light reflecting films on the first substrate and the second transmissive electrodes on the second substrate face each other, and where the second light reflecting films on the second substrate and the first transmissive electrodes on the first substrate face each other, and
wherein first interlayer insulating films composed of first protective films and first concave-convex resin films are formed under the second light reflective films, and second interlayer insulating films composed of second protective films and second concave-convex resin films are formed above the first light reflective films.

2. The liquid crystal device according to claim 1, further comprising:
a plurality of sub-pixels that are arranged in a first direction and a second direction crossing each other,
wherein the sub-pixels include first sub-pixels where light reflecting films are provided on the side facing the liquid crystal layer of the second substrate and second sub-pixels where light reflecting films are provided on the side facing the liquid crystal layer of the first substrate, and the first sub-pixels are different from the second sub-pixels in size.

3. The liquid crystal device according to claim 1, further comprising:

a plurality of sub-pixels that are arranged in a first direction and a second direction crossing each other, wherein the sub-pixels include first sub-pixels where light reflecting films are provided on the side facing the liquid crystal layer of the second substrate and second sub-pixels where light reflecting films are provided on the side facing the liquid crystal layer of the first substrate, the first sub-pixels and the second sub-pixels are respectively arranged adjacent to each other in any one of the first direction and the second direction, the first sub-pixels and the second sub-pixels are alternately arranged in the other of the first direction and the second direction.

4. The liquid crystal device according to claim 3, wherein the transmissive electrodes provided in the first sub-pixels on the side facing the liquid crystal layer of the first substrate are disposed in a strip along the second sub-pixels adjacent to each other and the transmissive electrodes provided in the second sub-pixels on the side facing the liquid crystal layer of the second substrate are disposed in a strip along the first sub-pixels adjacent to each other.

5. The liquid crystal device according to claim 1, further comprising a plurality of sub-pixels that are arranged in a first direction and a second direction crossing each other, wherein the sub-pixels include first sub-pixels where light reflecting films are provided on the side facing the liquid crystal layer of the second substrate and second sub-pixels where light reflecting films are provided on the side facing the liquid crystal layer of the first substrate, wherein coloring films of one color of a plurality of colors are disposed in a predetermined arrangement on at least one of the first substrate and the second substrate, corresponding to each of the first sub-pixels and the second sub-pixels.

6. An electronic apparatus comprising the liquid crystal device according to claim 1.

7. The liquid crystal device of claim 1, wherein the active elements are thin film transistors.

8. The liquid crystal device of claim 1, further comprising:
first overcoat films formed between the first coloring films and the first transmissive electrodes; and
second overcoat films formed between the second coloring films and the second transmissive electrodes.

* * * * *